US012652645B2

(12) United States Patent
Hirzallah et al.

(10) Patent No.: US 12,652,645 B2
(45) Date of Patent: Jun. 9, 2026

(54) VALIDATION OF POSITIONING MODELS

(71) Applicant: QUALCOMM Incorporated, San Diego, CA (US)

(72) Inventors: Mohammed Ali Mohammed Hirzallah, San Marcos, CA (US); Srinivas Yerramalli, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 18/417,665

(22) Filed: Jan. 19, 2024

(65) Prior Publication Data

US 2025/0240765 A1 Jul. 24, 2025

(51) Int. Cl.
*H04W 4/02* (2018.01)
*H04W 64/00* (2009.01)

(52) U.S. Cl.
CPC ................................. *H04W 64/006* (2013.01)

(58) Field of Classification Search
CPC ...... G01S 5/021; G01S 5/0236; G01S 5/0278; H04W 64/006
USPC ....................................................... 455/456.2
See application file for complete search history.

(56) References Cited

U.S. PATENT DOCUMENTS

2024/0388875 A1* 11/2024 Wang ........................ G06N 3/08
2025/0212160 A1* 6/2025 Chen ..................... G01S 5/0205
2025/0285030 A1* 9/2025 Huangfu ................... G06N 3/08

FOREIGN PATENT DOCUMENTS

WO 2023143572 A1 8/2023

OTHER PUBLICATIONS

IP.com search history (Year: 2025).*
International Search Report and Written Opinion—PCT/US2025/010549—ISA/EPO—May 8, 2025.
Nokia, et al., "Other Aspects on ML for Positioning Accuracy Enhancement", 3GPP TSG RAN WG1 #112bis-e, R1-2302633, 3rd Generation Partnership Project (3GPP), Mobile Competence Centre, 650, Route Des Lucioles, F-06921 Sophia-Antipolis Cedex, France, vol. 3GPP RAN 1, No. Electronic Meeting, Apr. 17, 2023-Apr. 26, 2023, 35 Pages, Apr. 7, 2023, XP052352118, section 5 "Performance Monitoring", p. 15-p. 20.

(Continued)

*Primary Examiner* — Moustapha Diaby
(74) *Attorney, Agent, or Firm* — Procopio, Cory, Hargreaves & Savitch LLP

(57) ABSTRACT

A network entity, for example a location management function (LMF), may transmit a first configuration to validate a positioning model. A user equipment (UE) may receive the first configuration to validate the positioning model. The UE may receive a set of positioning signals. The UE may measure the set of positioning signals based on the first configuration. The UE may obtain a set of positioning model outputs based on the measured set of positioning signals and the first configuration. The UE may transmit a validation report based on the set of positioning model outputs and the first configuration. The network entity may receive the validation report. The validation report may include at least one of a first indicator that the positioning model is valid or a second indicator of a set of positioning model outputs based on the first configuration.

29 Claims, 11 Drawing Sheets

(56) References Cited

OTHER PUBLICATIONS

Vivo: "Other Aspects on AI/ML for Positioning Accuracy Enhancement", 3GPP TSG RAN WG1 #110bis-e, R1-2208639, 3rd Generation Partnership Project (GPP), Mobile Competence Centre, 650, Route Des Lucioles, F-06921 Sophia-Antipolis Cedex, France, vol. RAN WG1, No. e-Meeting, Oct. 10, 2022-Oct. 19, 2022, 20 Pages, Sep. 30, 2022, XP052276562, figures 8, 9, 10, 12, 16, 17A, table 3, p. 9-p. 19.

* cited by examiner server 520 network entity 508 wireless device 506 wireless device 502 wireless device 504

518

514

512

516

500

802 transmit a first configuration to validate a positioning model

804 receive a validation report including at least one of a first indicator that the positioning model is valid or a second indicator of a set of positioning model outputs based on the first configuration

800

VALIDATION OF POSITIONING MODELS

TECHNICAL FIELD

The present disclosure relates generally to communication systems, and more particularly, to a wireless positioning system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE). The apparatus may receive a first configuration to validate a positioning model. The apparatus may receive a set of positioning signals. The apparatus may measure the set of positioning signals based on the first configuration. The apparatus may obtain a set of positioning model outputs based on the measured set of positioning signals and the first configuration. The apparatus may obtain the set of positioning model outputs based on the measured set of positioning signals and the first configuration by calculating the set of positioning model outputs based on the measured set of positioning signals and the first configuration using the positioning model. The apparatus may obtain the set of positioning model outputs based on the measured set of positioning signals and the first configuration by transmitting the measured set of positioning signals based on the first configuration and by receiving the set of positioning model outputs based on the transmitted measured set of positioning signals and the positioning model. The apparatus may transmit a validation report based on the set of positioning model outputs and the first configuration.

In an aspect of the disclosure, a method, a computer-readable medium, and an apparatus are provided. The apparatus may include a network entity. The network entity may include a location management function (LMF). The network entity may transmit a first configuration to validate a positioning mode. The network entity may receive a validation report. The validation report may include at least one of a first indicator that the positioning model is valid or a second indicator of a set of positioning model outputs based on the first configuration.

In some aspects, the techniques described herein relate to a method of wireless communication at a user equipment (UE), including: receiving a first configuration to validate a positioning model; receiving a set of positioning signals; measuring the set of positioning signals based on the first configuration; obtaining a set of positioning model outputs based on the measured set of positioning signals and the first configuration; and transmitting a validation report based on the set of positioning model outputs and the first configuration.

In some aspects, the techniques described herein relate to a method, where obtaining the set of positioning model outputs based on the measured set of positioning signals and the first configuration includes: calculating the set of positioning model outputs based on the measured set of positioning signals and the first configuration using the positioning model.

In some aspects, the techniques described herein relate to a method, where obtaining the set of positioning model outputs based on the measured set of positioning signals and the first configuration includes: transmitting the measured set of positioning signals based on the first configuration; and receiving the set of positioning model outputs based on the transmitted measured set of positioning signals and the positioning model.

In some aspects, the techniques described herein relate to a method, further including: transmitting a second configuration to calculate the set of positioning model outputs based on the measured set of positioning signals and the first configuration before the transmission of the measured set of positioning signals.

In some aspects, the techniques described herein relate to a method, where the first configuration includes at least one of: a first indicator of a first schedule for when to obtain the set of positioning model outputs; a second indicator of a first event that triggers the obtainment of the set of positioning model outputs; a third indicator of how to format the validation report based on the set of positioning model outputs; a fourth indicator of a set of resources to use for the measurement of the set of positioning signals; a fifth indicator of a second schedule of when to transmit the validation report; a sixth indicator of a second event that triggers the transmission of the validation report; or a seventh indicator of the positioning model.

In some aspects, the techniques described herein relate to a method, further including: receiving a second configuration to modify a positioning model configuration for life cycle management (LCM) of the positioning model at the UE; and modifying the positioning model configuration based on the second configuration.

In some aspects, the techniques described herein relate to a method, where the second configuration includes at least one of: a first indicator to activate the positioning model for a calculation of a second set of positioning model outputs; a second indicator to deactivate a second positioning model for the calculation of the second set of positioning model outputs; or a third indicator to switch between using the positioning model or the second positioning model for the calculation of the second set of positioning model outputs.

In some aspects, the techniques described herein relate to a method, where receiving the second configuration includes: receiving a long-term evolution (LTE) positioning protocol (LPP) message including the second configuration.

In some aspects, the techniques described herein relate to a method, where the LPP message includes at least one of: an LPP provide location message; an LPP assistance data message; an LPP broadcast message; or a positioning system information block (posSIB) message.

In some aspects, the techniques described herein relate to a method, where receiving the first configuration includes: receiving a long-term evolution (LTE) positioning protocol (LPP) message including the first configuration.

In some aspects, the techniques described herein relate to a method, where the LPP message includes at least one of: an LPP provide location message; an LPP assistance data message; an LPP broadcast message; or a positioning system information block (posSIB) message.

In some aspects, the techniques described herein relate to a method, further including: calculating an accuracy metric of the positioning model by comparing the set of positioning model outputs to a set of expected outputs, where the validation report includes an indicator of the calculated accuracy metric.

In some aspects, the techniques described herein relate to a method, further including: calculating the set of expected outputs based on the measured set of positioning signals using a second positioning model.

In some aspects, the techniques described herein relate to a method, further including: receiving the set of expected outputs before the calculation of the accuracy metric.

In some aspects, the techniques described herein relate to a method, further including: transmitting a capability message including an indicator that the UE is configured to validate the positioning model before the reception of the first configuration.

In some aspects, the techniques described herein relate to a method, where the capability message further includes a set of capability conditions for the UE to validate a set of positioning models before the reception of the first configuration, where the first configuration satisfies the set of capability conditions, where the set of capability conditions include at least one of: a first indicator of a maximum number of positioning models that the UE is configured to simultaneously stage for the UE to validate the set of positioning models; a second indicator of a first maximum amount of memory that the UE is configured to use for the UE to validate the set of positioning models; a third indicator of a second maximum amount of processing power that the UE is configured to use for the UE to validate the set of positioning models; a fourth indicator of a set of timing gaps used by the UE for the UE to validate the set of positioning models; or a fifth indicator of a set of resource conditions associated with each of the set of positioning models.

In some aspects, the techniques described herein relate to a method, further including: receiving a request for the capability message, where the transmission of the capability message is in response to the request.

In some aspects, the techniques described herein relate to a method, where the capability message includes a long-term evolution (LTE) positioning protocol (LPP) message including the capability message.

In some aspects, the techniques described herein relate to a method, where the LPP message includes an LPP capability exchange message.

In some aspects, the techniques described herein relate to a method of wireless communication at a network entity, including: transmitting a first configuration to validate a positioning model; and receiving a validation report including at least one of a first indicator that the positioning model is valid or a second indicator of a set of positioning model outputs based on the first configuration.

In some aspects, the techniques described herein relate to a method, where the first configuration includes at least one of: a third indicator of a first schedule for when to obtain the set of positioning model outputs; a fourth indicator of a first event that triggers the validation of the positioning model; a fifth indicator of how to format the validation report; a sixth indicator of a set of resources to use for the validation of the positioning model; a seventh indicator of a second schedule of when to transmit the validation report; an eighth indicator of a second event that triggers a transmission of the validation report; or a ninth indicator of the positioning model.

In some aspects, the techniques described herein relate to a method, further including: transmitting a second configuration to modify a positioning model configuration for life cycle management (LCM) of the positioning model at a user equipment (UE) based on the validation report.

In some aspects, the techniques described herein relate to a method, where the second configuration includes at least one of: a third indicator to activate the positioning model for a calculation of a second set of positioning model outputs; a fourth indicator to deactivate a second positioning model for the calculation of the second set of positioning model outputs; or a fifth indicator to switch between using the positioning model or the second positioning model for the calculation of the second set of positioning model outputs.

In some aspects, the techniques described herein relate to a method, where transmitting the second configuration includes: transmitting a long-term evolution (LTE) positioning protocol (LPP) message including the second configuration.

In some aspects, the techniques described herein relate to a method, where the LPP message includes at least one of: an LPP provide location message; an LPP assistance data message; an LPP broadcast message; or a positioning system information block (posSIB) message.

In some aspects, the techniques described herein relate to a method, where receiving the validation report includes receiving the validation report from the UE, where transmitting the second configuration includes transmitting the second configuration to the UE.

In some aspects, the techniques described herein relate to a method, where receiving the validation report includes receiving the validation report from a second UE different from the UE, where transmitting the second configuration includes transmitting the second configuration to the UE.

In some aspects, the techniques described herein relate to a method, where transmitting the first configuration includes: transmitting a long-term evolution (LTE) positioning protocol (LPP) message including the first configuration.

In some aspects, the techniques described herein relate to a method, where the LPP message includes at least one of: an LPP provide location message; an LPP assistance data message; an LPP broadcast message; or a positioning system information block (posSIB) message.

In some aspects, the techniques described herein relate to a method, where the first configuration includes a third indicator to validate the positioning model based on a set of expected outputs calculated based on a second positioning model.

In some aspects, the techniques described herein relate to a method, further including: transmitting the set of expected outputs before the reception of the validation report.

In some aspects, the techniques described herein relate to a method, further including: calculating the set of expected outputs before the transmission of the set of expected outputs.

In some aspects, the techniques described herein relate to a method, further including: receiving a capability message including an indicator that a user equipment (UE) is configured to validate the positioning model, where the transmission of the first configuration is in response to the capability message.

In some aspects, the techniques described herein relate to a method, where the capability message further includes a set of capability conditions for the UE to validate a set of positioning models before the reception of the first configuration, further including: configuring the first configuration to satisfy the set of capability conditions before the transmission of the first configuration.

In some aspects, the techniques described herein relate to a method, where the set of capability conditions include at least one of: a third indicator of a maximum number of positioning models that the UE is configured to simultaneously stage for the UE to validate the set of positioning models; a fourth indicator of a first maximum amount of memory that the UE is configured to use for the UE to validate the set of positioning models; a fifth indicator of a second maximum amount of processing power that the UE is configured to use for the UE to validate the set of positioning models; a sixth indicator of a set of timing gaps used by the UE for the UE to validate the set of positioning models; or a seventh indicator of a set of resource conditions associated with each of the set of positioning models.

In some aspects, the techniques described herein relate to a method, further including: transmitting a request for the capability message before the reception of the capability message.

In some aspects, the techniques described herein relate to a method, where the capability message includes a long-term evolution (LTE) positioning protocol (LPP) message including the capability message.

In some aspects, the techniques described herein relate to a method, where the LPP message includes an LPP capability exchange message.

In some aspects, the techniques described herein relate to a method, where the network entity includes at least one of a location management function (LMF) or an over-the-top (OTT) location server.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
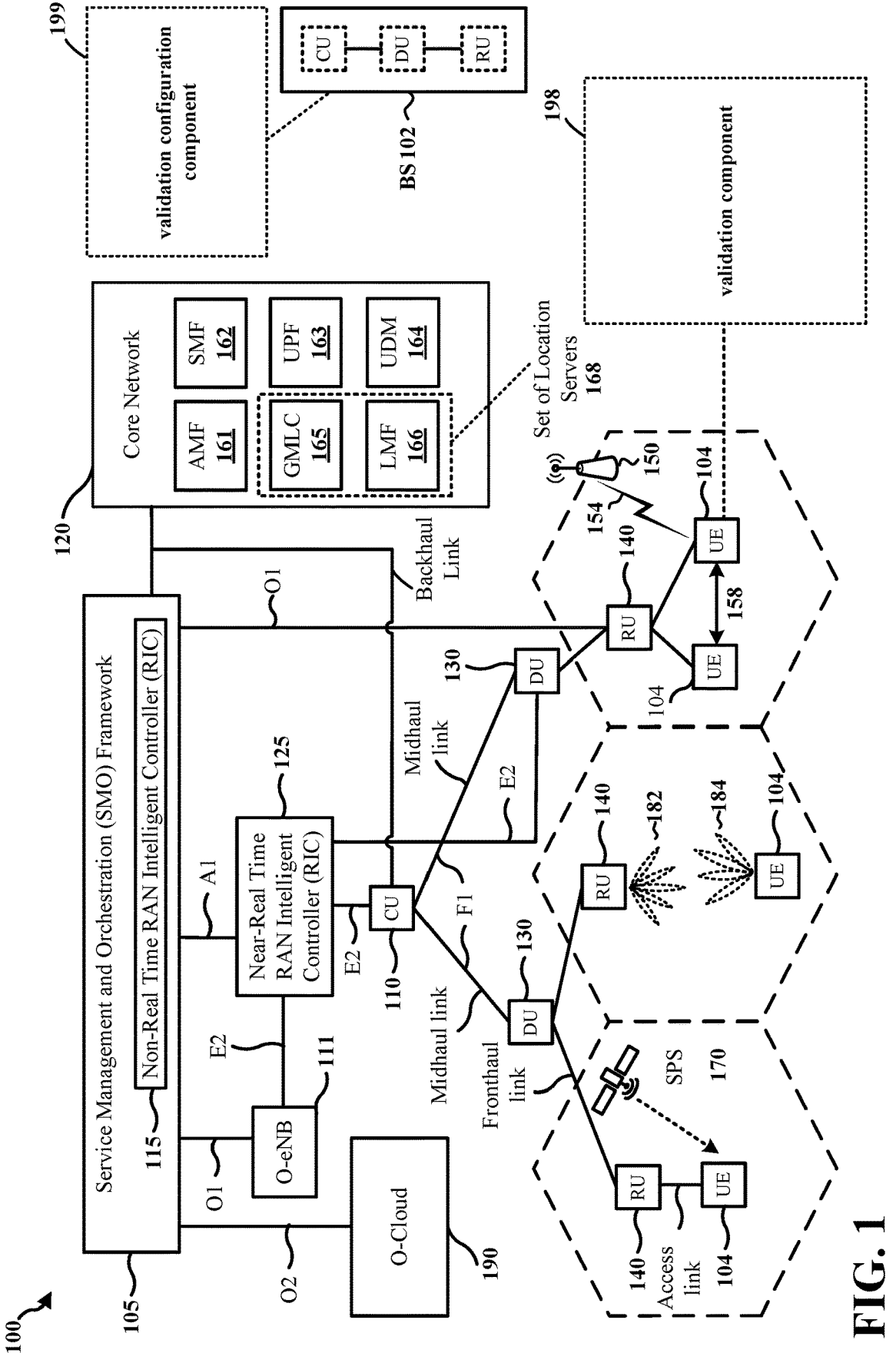
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to wireless positioning systems. Some aspects more specifically relate to wireless positioning systems that utilize positioning models. Other aspects more specifically relate to validating such positioning models for use at wireless devices. In some examples, a user equipment (UE) may receive a first configuration to validate a positioning model. The UE may receive a set of positioning signals. The UE may measure the set of positioning signals based on the first configuration. The UE may obtain a set of positioning model outputs based on the measured set of positioning signals and the first configuration. The UE may obtain the set of positioning model outputs based on the measured set of positioning signals and the first configuration by calculating the set of positioning model outputs based on the measured set of positioning signals and the first configuration using the positioning model. The UE may obtain the set of positioning model outputs based on the measured set of positioning signals and the first configuration by transmitting the measured set of positioning signals based on the first configuration and by receiving the set of positioning model outputs based on the transmitted measured set of positioning signals and the positioning model. The UE may transmit a validation report based on the set of positioning model outputs and the first configuration. In some examples, a network entity, such as a location management function (LMF), may transmit a first configuration to validate a positioning mode. The network entity may receive a validation report. The validation report may include at least one of a first indicator that the positioning model is valid or a second indicator of a set of positioning model outputs based on the first configuration.

In some aspects, a UE may be configured to support multiple site-specific positioning models (e.g., AI/ML positioning models). However, a UE may be configured to have a limited number of positioning models active during a common time period. Ensuring positioning model validity and low latency to activate valid positioning models may be difficult, particularly while accounting for UE hardware limitations. In one aspect, a UE may receive one or more validation configurations from a network entity (e.g., a location server) to stage a positioning model and validate the positioning model applicability to a scenario. Once validated, the UE may notify the network entity that the staged positioning model is valid and ready to be activated. The UE may further provide capability to the network entity regarding staging and validating such positioning models.

In some aspects, a positioning model may be site-specific, such that a plurality of positioning models may be used by a UE to support operation of the UE over dynamic environments, or over multiple sites. In some aspects, a UE may verify a plurality of models for seamless operation over a dynamic radio environment and/or over operation over multiple sites. Such validation techniques may be used to apply life cycle management (LCM) to positioning models, or positioning model control, including positioning model activation, deactivation, switching between positioning models, and selection of positioning models. Before being deployed on a UE, a UE may be configured to first test and validate the positioning model to ensure its applicability to a new setting. A UE may be configured to support multiple positioning models. However, a UE may be configured to allow a limited number of positioning models to be active at a time. Loading a positioning model may use some processing at the UE side (e.g., loading and compiling the model). The latency used by the UE to prepare a positioning model may be calculated based on the UE capability (e.g., memory, processing unit parallelization).

Particular aspects of the subject matter described in this disclosure can be implemented to realize one or more of the following potential advantages. In some examples, by enabling a network entity to configure validation for a positioning model, the described techniques can be used to ensure that a positioning model is valid. Such techniques may also be used to achieve low latency to activate valid positioning models while accounting for UE hardware limitations. In some aspects, a UE may be configured to consider a plurality of models for validation to apply life cycle management (LCM) over the plurality of positioning models.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)).

In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-cNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR11 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104.

The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a validation component 198 that may be configured to receive a first configuration to validate a positioning model. The validation component 198 may be configured to receive a set of positioning signals. The validation component 198 may be configured to measure the set of positioning signals based on the first configuration. The validation component 198 may be configured to obtain a set of positioning model outputs based on the measured set of positioning signals and the first configuration. The validation component 198 may be configured to obtain the set of positioning model outputs based on the measured set of positioning signals and the first configuration by calculating the set of positioning model outputs based on the measured set of positioning signals and the first configuration using the positioning model. The validation component 198 may be configured to obtain the set of positioning model outputs based on the measured set of positioning signals and the first configuration by transmitting the measured set of positioning signals based on the first configuration and by receiving the set of positioning model outputs based on the transmitted measured set of positioning signals and the positioning model. The validation component 198 may be configured to transmit a validation report based on the set of positioning model outputs and the first configuration. In certain aspects, the base station 102, LMF 166, or one or more of the set of location servers 168 may have a validation configuration component 199 that may be configured to transmit a first configuration to validate a positioning mode. The validation configuration component 199 may be configured to receive a validation report. The validation report may include at least one of a first indicator that the positioning model is valid or a second indicator of a set of positioning model outputs based on the first configuration.

Figure 2:
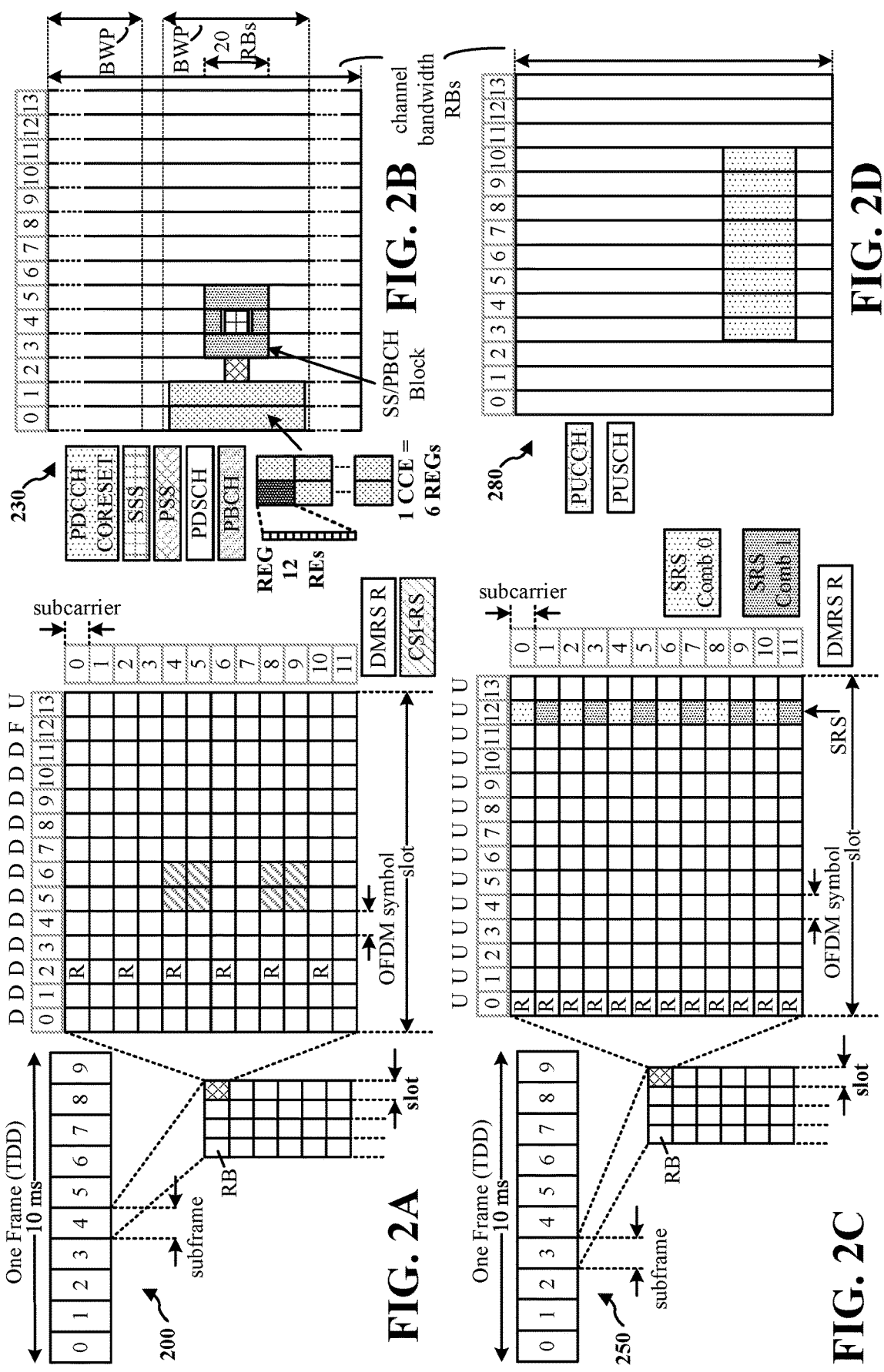
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS<br>Δf = $2^\mu$ · 15[kHz] | Cyclic<br>prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu$*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
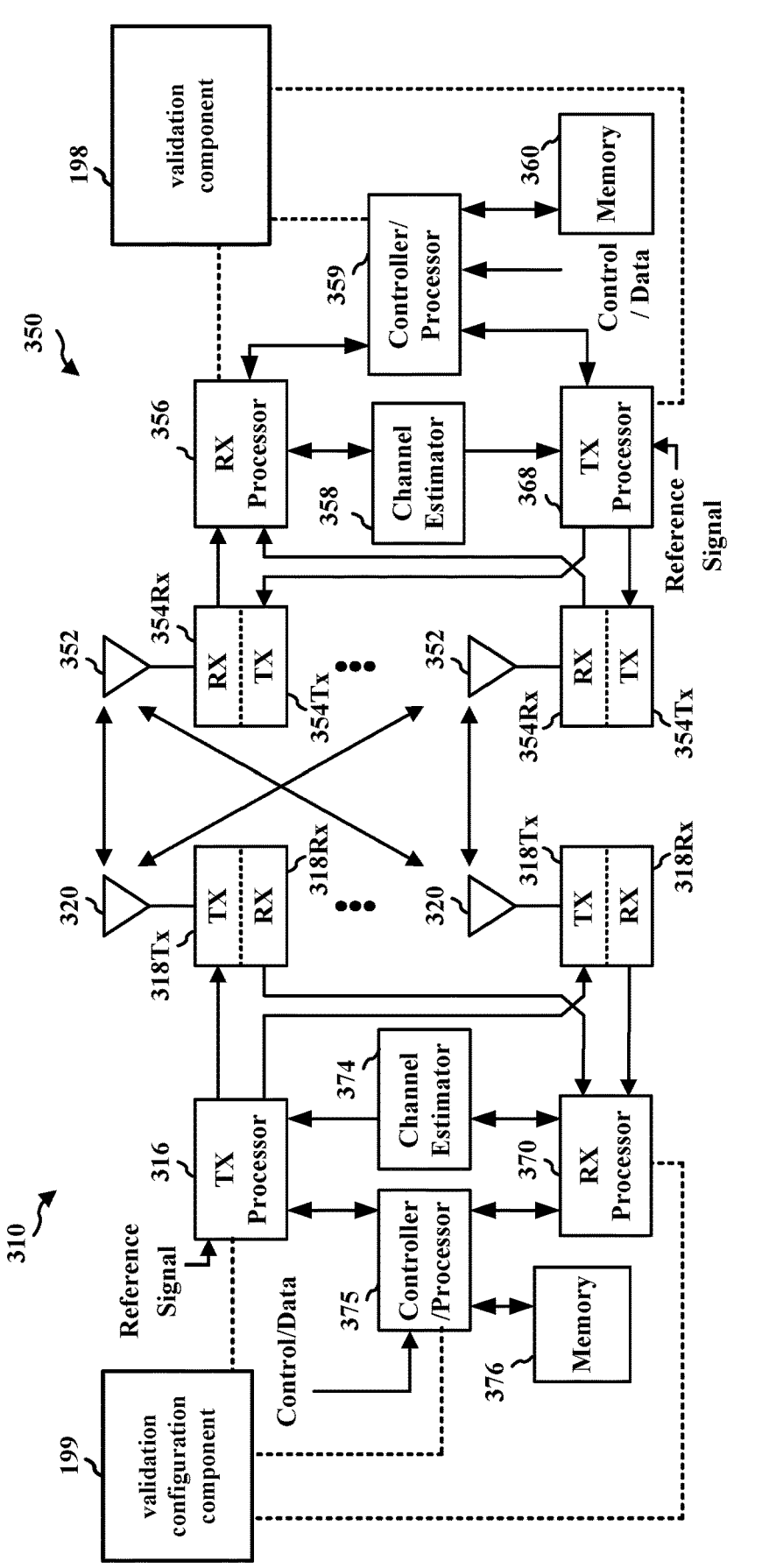
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization. The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the validation component 198 of FIG. 1.

At least one of the TX processor 316, the RX processor 370, and the controller/processor 375 may be configured to perform aspects in connection with the validation configuration component 199 of FIG. 1.

Figure 4:
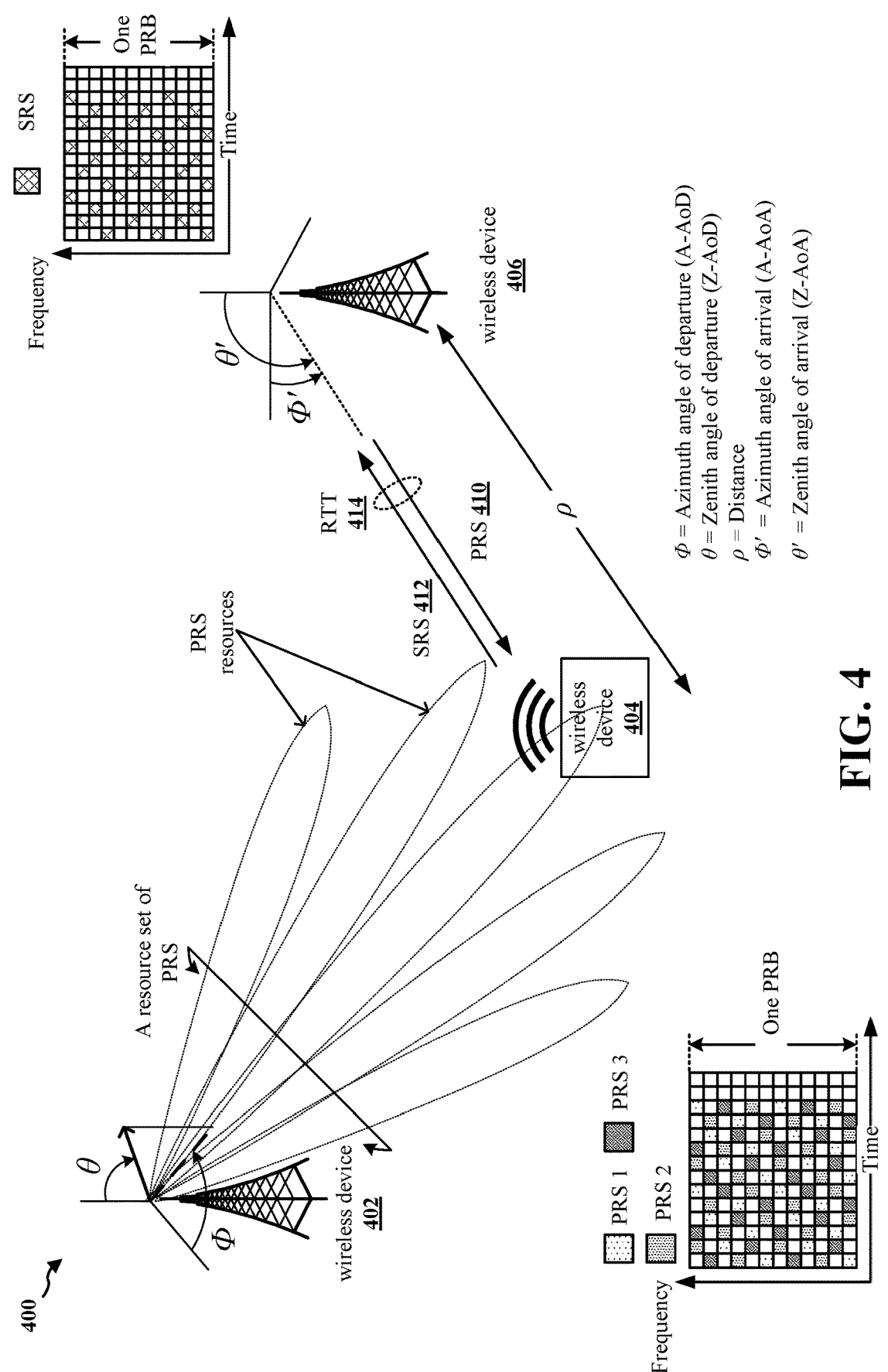
FIG. 4 is a diagram illustrating an example of a positioning based on positioning signal measurements.

FIG. 4 is a diagram 400 illustrating an example of a positioning based on positioning signal measurements. A positioning signal may be any reference signal which may be measured to calculate a position attribute or a location attribute of a wireless device, for example a positioning reference signal (PRS), a sounding reference signal (SRS), a channel state information (CSI) reference signal (CSI-RS), or a synchronization and signal block (SSB). The wireless device 402 may be a base station, such as a TRP, or a UE with a known position/location, such as a positioning reference unit (PRU) or a UE with a high-accuracy sensor that may identify the location of the UE, for example a GNSS sensor or a GPS sensor. The wireless device 406 may be a base station or a UE with a known position/location. The wireless device 404 may be a UE or a TRP configured to perform positioning to gather data, for example to gather data to train an artificial intelligence machine learning (AI/ML or AIML) model, test positioning signal strength or test positioning noise attributes in an area. The wireless device 404 may transmit UL-SRS 412 at time $T_{SRS\_TX}$ and receive DL positioning reference signals (PRS) (DL-PRS) 410 at time $T_{PRS\_RX}$. The wireless device 406 may receive the UL-SRS 412 at time $T_{SRS\_RX}$ and transmit the DL-PRS 410 at time $T_{PRS\_TX}$. The wireless device 404 may receive the DL-PRS 410 before transmitting the UL-SRS 412, or may transmit the UL-SRS 412 before receiving the DL-PRS 410. In both cases, a positioning server (e.g., location server(s) 168, LMF 166) or the wireless device 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple wireless devices 402, 406 and measured by the wireless device 404, and the measured TRP Rx-Tx time difference measurements (i.e., $|T_{SRS\_RX}-T_{PRS\_TX}|$) and UL-SRS-RSRP at multiple wireless devices 402, 406 of uplink signals transmitted from wireless device 404. The wireless device 404 may measure the UE Rx-Tx time difference measurements (and optionally DL-PRS-RSRP of the received signals) using assistance data received from the positioning server, and the wireless devices 402, 406 may measure the gNB Rx-Tx time difference measurements (and optionally UL-SRS-RSRP of the received signals) using assistance data received from the positioning server. The measurements may be used at the positioning server or the wireless device 404 to determine the RTT. The RTT may be used to estimate the location of the wireless device 404. Other methods are possible for determining the RTT, such as for example using DL-TDOA and/or UL-TDOA measurements.

DL-AoD positioning may make use of the measured DL-PRS-RSRP of downlink signals received from multiple wireless devices 402, 406 at the wireless device 404. The wireless device 404 may measure the DL-PRS-RSRP of the received signals using assistance data received from the positioning server, and the resulting measurements may be used along with the azimuth angle of departure (A-AoD), the zenith angle of departure (Z-AoD), and/or other configuration information to locate the wireless device 404 in relation to the neighboring wireless devices 402, 406.

DL-TDOA positioning may make use of the DL reference signal time difference (RSTD) (and optionally DL-PRS-RSRP) of downlink signals received from multiple wireless devices 402, 406 at the wireless device 404. The wireless device 404 may measure the DL RSTD (and optionally DL-PRS-RSRP) of the received signals using assistance data received from the positioning server, and the resulting measurements may be used along with other configuration information to locate a position/location the wireless device 404 in relation to the neighboring wireless devices 402, 406.

UL-TDOA positioning may make use of the UL relative time of arrival (RTOA) (and optionally UL-SRS-RSRP) at multiple wireless devices 402, 406 of uplink signals transmitted from wireless device 404. The wireless devices 402, 406 may measure the UL-RTOA (and optionally UL-SRS-RSRP) of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices 402, 406 of uplink signals transmitted from the wireless device 404. The wireless devices 402, 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Figure 5:
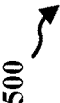
FIG. 5 is a diagram illustrating an example of positioning based on positioning signal measurements.

FIG. 5 is a diagram 500 illustrating a network entity 508 that may be configured to coordinate a wireless device 502 and a wireless device 506 to perform positioning with a wireless device 504. The location of the wireless device 502 and the wireless device 506 may be known to at least one of the devices, such as the wireless device 502, the wireless device 504, the wireless device 506, the network entity 508, and/or the server 520. The wireless device 502 may be a base station, a gNB, or a TRP. The wireless device 506 may be a base station, a gNB, or a TRP. The wireless device 504 may be a UE. In some aspects, the UE may be a PRU. A PRU may be a UE with a known location. For example, the PRU may be affixed in a known location or may be placed in a known location for a period of time, or the PRU may have a set of sensors (e.g., high-accuracy GNSS sensor) that may be used to accurately calculate the location of the PRU. In some aspects, the wireless device 504 may be a PRU configured to train a positioning model based on a set of inputs and a set of labels. In some aspects, the wireless device 504 may be a UE configured to use a positioning model to calculate a set of outputs based on a set of inputs, for example measurements of positioning signals. The network entity 508 may be connected to the wireless device 502 and the wireless device 506 via a physical link, for example a backhaul link or a midhaul link, or via a wireless link, such as an air interface (a UE-UTRAN (Uu)) link. The network entity 508 may be part of a core network, such as an LMF or a set of location servers. The network entity 508 may configure positioning occasions between the wireless device 502, the wireless device 504, and the wireless device 506. The server 520 may be an over-the-top (OTT) server or some other server functionally connected to a network that communicates with the network entity 508, the wireless device 502 and/or the wireless device 506, and/or with the wireless device 504 via a wireless device, such as the wireless device 502 and/or the wireless device 506. The server 520 may have storage for storing positioning models, for example AI/ML positioning models, trained using sets of positioning signals received by a wireless device, such as the wireless device 502, the wireless device 504, and/or the wireless device 506.

To perform positioning, the network entity 508 may configure one or more of the wireless devices to transmit positioning signals at one another. For example, the wireless device 504 may transmit the set of positioning signals 512 at the wireless device 502. The set of positioning signals 512 may be a set of SRSs, SSBs, or CSI-RSs. The wireless device 502 may measure the set of positioning signals 512. The wireless device 502 may transmit the set of positioning signals 516 at the wireless device 504. The set of positioning signals 516 may be a set of PRSs, SSBs, or CSI-RSs. The wireless device 504 may measure the set of positioning signals 516. The wireless device 504 may transmit a set of positioning signals 514 at the wireless device 506. The set of positioning signals 514 may be a set of SRSs, SSBs, or CSI-RSs. The wireless device 506 may measure the set of positioning signals 514. The wireless device 506 may transmit a set of positioning signals 518 at the wireless device 504. The set of positioning signals 518 may be a set of PRSs, SSBs, or CSI-RSs. The wireless device 504 may measure the set of positioning signals 518. One or more of the wireless devices may measure the received positioning signals to calculate a positioning measurement that may be used to calculate a position/location of the wireless device 504, or may be used to calculate a position/location of the wireless device 504. For example, if the location of the wireless device 502 and the location of the wireless device 506 are known, the location of the wireless device 504 may be calculated based on a RTT between the wireless device 502 and the wireless device 504, and a RTT between the wireless device 504 and the wireless device 506. In another example, the wireless device 504 may calculate an angle of arrival (AoA) or an angle of departure (AoD) of the set of positioning signals 516, and may calculate an AoA or an AoD of the set of positioning signals 518. The calculated AoAs and/or AoDs may be used to calculate a position of the wireless device 504 if the location of the wireless device 502 and the location of the wireless device 506 are also known. Other measurements, such as RTOA, line-of-sight (LOS)

identification (identifying whether there is a direct line-of-sight path between wireless devices), or multi-cell round trip time (multi-RTT) calculations may be performed to calculate the position of the wireless device 504, or to calculate a measurement that may be used to calculate the position of the wireless device 504.

In some aspects, a positioning model may be used to calculate one or more positioning metrics based on the measurements. For example, based on the measurements of the set of positioning signals 512 and/or the set of positioning signals 514 transmitted by the wireless device 504, a position/location of the wireless device 504 may be calculated or estimated, or an intermediate measurement that may be used to calculate the position/location of the wireless device 504 may be calculated or estimated. A positioning model may be trained using artificial intelligence (AI)/machine learning (ML) (AI/ML or AIML), based on a set of inputs (e.g., measurements of positioning signals, assistance information associated with the positioning signals) and a set of labels. A positioning signal may include any reference signal transmitted from a wireless device, such as a PRS, a SRS, an SSB, or a CSI-RS. An RS transmitted from a UE, such as a PRU, may be referred to as an uplink positioning signal, or an UL positioning signal. An RS transmitted from a base station, or TRP, may be referred to as a downlink positioning signal, or a DL positioning signal. A measurement may be a channel delay profile (DP), a channel power delay profile (PDP), a channel impulse response (CIR), a channel frequency response (CFR), or other measurement used for performing positioning on a target wireless device. A label may be a calculated, derived, or given (i.e., known) expected result associated with a set of inputs, such as a position/location of a wireless device 504 or an intermediate measurement (e.g., a timing measurement, an angle measurement, a LOS identification) that may be used to calculate the position/location of the wireless device 504. A set of inputs and a set of labels may be used for generating and/or training a positioning model using AI/ML.

When training a positioning model, measurements of positioning signals as inputs, clean or noisy labels (clean labels may have a quality metric greater or equal to a threshold, noisy labels may have a quality metric less than or equal to the threshold) as expected outputs, and training data assistance information as inputs or expected outputs. The positioning model may operate on any wireless device based on a set of inputs. For example, the wireless device 502 may have a positioning model configured to accept a set of positioning measurements and generate an estimate of a position/location of the wireless device 504. In another example, the wireless device 502 may have a positioning model configured to accept a set of positioning measurements and generate an intermediate measurement (e.g., a timing measurement, an angle measurement, a LOS identification) that may be used (by the wireless device 502, or another entity, such as the network entity 508, the wireless device 504, or the wireless device 506) to calculate the position/location of the wireless device 504. In another example, the network entity 508 may have a positioning model configured to accept a set of positioning measurements and generate an estimate of a position/location of the wireless device 504, or generate an intermediate measurement that may be used to calculate the position/location of the wireless device 504. In another example, the wireless device 504 may have a positioning model configured to accept a set of positioning measurements and generate an estimate of a position/location of the wireless device 504, or generate an intermediate measurement that may be used to calculate the position/location of the wireless device 504. In some aspects, the positioning measurements may be aggregated by the entity with the positioning model, for example the network entity 508 may aggregate measurements of the set of positioning signals 512 from the wireless device 502, measurements of the set of positioning signals 514 the wireless device 506 to use as inputs to a positioning model, measurements of the set of positioning signals 516 from the wireless device 504, and/or measurements of the set of positioning signals 518 from the wireless device 504.

A positioning model may be trained on a wireless device that performs positioning, such as the wireless device 502, the wireless device 504, the wireless device 506, the network entity 508, and/or the server 520. The inputs to the positioning model may include measurements of positioning signals, such as measurements of SRS, PRS, SSB, and/or CSI-RS. The inputs to the measurements may include assistance information associated with the measured positioning signals, such as BWP of a positioning signal resource, number of TRPs, beam information, positioning signal configuration). The labels/outputs for the positioning model may include a location, or an intermediate measurement. In one aspect, the server 520 may be an OTT server configured to train and store positioning models. In another aspects, the network entity 508 may be configured to train and store positioning models. In other words, the server 520 or the network entity 508 may be a training entity configured to train positioning models based on input measurements taken by a wireless device, such as the wireless device 502, the wireless device 504, and/or the wireless device 506, and based on labels either known (e.g., stored on memory) or calculated by at least one of the wireless device 502, the wireless device 504, the wireless device 506, and/or the network entity 508. A positioning model may be configured to calculate a set of outputs. The set of outputs may include, for example, a reference signal time difference (RSTD), a line of sight (LOS) indicator (e.g., whether there exists a direct line-of-sight path between wireless devices, the likelihood of whether there exists a direct line-of-sight path between wireless devices), a multipath timing indicator (e.g., a time of flight per path, a time of arrival per path with respect to a timing mark), a multipath power indicator (e.g., strength of a signal per path), a multipath phase indicator (e.g., phase of a signal per path), a reference signal received power (RSRP), and/or an angle of departure (AoD).

In some aspects, a positioning model may be configured to use measurements of positioning signals transmitted from a wireless device to calculate a position of the wireless device 504, or to calculate an intermediate measurement that may be used to calculate the position of the wireless device 504. The positioning model may be trained via a training entity, and may be used at the wireless device 502, at the wireless device 504, at the wireless device 506, or at the network entity 508. For example, a positioning model at the wireless device 504 may be configured to calculate the location of the wireless device 504 based on measurements of the set of positioning signals 516 and/or the set of positioning signals 518. In another example, the wireless device 502 may transmit a set of intermediate measurements to the network entity 508 so that the network entity 508 may calculate the location of the wireless device 504 based on the set of intermediate measurements. In another example, the wireless device 504 may transmit measurements of the set of positioning signals 516 and/or the set of positioning signals 518 to the network entity 508. The positioning model may be at the network entity 508. The positioning model at the network entity 508 may calculate the location of the wireless device 504 based on the transmitted measurements of the set of positioning signals 516 and/or the set of positioning signals 518 from the wireless device 504, the transmitted measurements of the set of positioning signals 512 from the wireless device 502, and/or the transmitted measurements of the set of positioning signals 514 from the wireless device 506. In other words, any of the wireless device 502, the wireless device 504, and/or the wireless device 506 may assist the network entity 508 in performing positioning using a trained positioning model.

In some aspects, a positioning model may be site-specific. For example, a first positioning model may be trained in a location, or a set of locations, associated with a first site having a first set of borders, and a second positioning model may be trained in a location, or a set of locations, associated with a second site having a second set of borders. A wireless device may be configured to use one of a plurality of site-specific positioning models. For example, the wireless device may select a site-specific positioning model based on its location, or may select a site-specific positioning model based on an indicator, for example a signal transmitted from the network entity 508 that indicates that a particular site-specific positioning model from a plurality of site-specific positioning models be selected.

Measurements of positioning signals may be performed by measuring channels between a target device (e.g., the wireless device 504) and a set of network nodes (e.g., the wireless device 502 and the wireless device 506). The wireless device 504 may transmit a positioning signal, such as an SRS, an SSB, or a CSI-RS. The wireless device 502 and/or the wireless device 506 may measure the positioning signal for data collection purposes to train a positioning model. The wireless device 504 and/or the wireless device 506 may transmit a positioning signal, such as a PRS, an SSB, or a CSI-RS. The wireless device 504 may measure the positioning signal for data collection purposes to train the positioning model. The wireless device 502, the wireless device 504, and/or the wireless device 506 may measure a positioning signal resource in a plurality of ways, for example the measurement may be a channel impulse response (CIR), a channel frequency response (CFR), a power delay profile (PDP), a delay profile (DP), a set of reflection paths, a reception-transmission (Rx-Tx) time difference, a received signal strength indicator (RSSI), a reference signal received power (RSRP), a reference signal received power per path (RSRPP), a reference signal received quality (RSRQ), a time of arrival (ToA), a reference signal time difference (RSTD), or an angle of departure (AoD).

While the diagram 500 illustrates two positioning neighbor wireless devices, wireless device 502 and wireless device 506, configured to perform positioning with one positioning target wireless device, wireless device 504, to calculate a position/location of the wireless device 504, any number of positioning neighbor wireless devices may be configured to perform positioning with any number of positioning target wireless devices. For example, four positioning neighbor wireless devices may be configured to calculate the position/location of two positioning target wireless devices, three positioning neighbor wireless devices may be configured to calculate the position/location of one positioning target wireless device, or two positioning neighbor wireless devices may be configured to calculate the position/location of one positioning target wireless device.

In some aspects, the network entity 508 may be configured to transmit a validation configuration to the wireless device 504. The validation configuration may indicate for the wireless device 504 to stage and validate one or more positioning models at the wireless device 504. The wireless device 504 may obtain measurements of positioning signals, such as the set of positioning signals 516 and/or the set of positioning signals 518, and may validate the performance of one or more positioning models based on the measurements of the positioning signals. The wireless device 504 may then report the validation performance to the network entity 508. In some aspects, the network entity 508 may then configure life cycle management (LCM) (i.e., LCM configuration, activation configuration) of one or more positioning models based on the validation performance (e.g., positioning model control operation).

The validation configuration may indicate to the wireless device 504 at least one of (a) how often to validate a positioning model, (b) a validation outcome to be obtained (e.g., valid if accurate within a 10% tolerance) for a positioning model, (c) positioning resources (e.g., RF identifiers, BW thresholds) for the wireless device 504 to use for validation, (d) reporting aspects of the validation outcome (e.g., periodicity, an event that triggers a validation occasion), or (e) an identifier (ID) of a positioning model to be staged and validated.

The activation configuration may indicate to the wireless device 504 at least one of (a) an activation command for a validated positioning model, (b) a deactivation command for a positioning model previously activated at the wireless device 504 (e.g., a currently active positioning model), (c) a switching command for the wireless device 504 to switch operation of performing positioning from a first positioning model to a second positioning model.

The network entity 508 may transmit the validation configuration and/or the activation configuration as a long-term evolution (LTE) positioning protocol (LPP) message, for example as part of LPP provide location messaging, LPP assistance data messaging, or LPP broadcast messaging (e.g., a positioning system information block (posSIB).

In some aspects, the wireless device 504 may transmit an indication to the network entity 508 of its capability to stage and validate a positioning model (e.g., a UE capability). The UE capability may include an indication of at least one of (a) a number of models that the wireless device 504 may simultaneously stage and validate for a set of positioning signals, (b) memory limits of the wireless device 504 to stage and validate a set of positioning models (e.g., max memory), (c) processing limits of the wireless device 504 to stage and validate a set of positioning models (e.g., max central processing unit (CPU) cycles), (d) processing gap conditions for the wireless device 504 to stage and validate a set of positioning models (e.g., min processing time), (e) measurement gap conditions for the wireless device 504 to stage and validate a set of positioning models (e.g., min measurement gap period), or (f) resource configuration conditions for the wireless device 504 to measure positioning signals for validation (e.g., min/max BW) of a set of positioning models. The wireless device 504 may transmit the UE capability in response to a request by the network entity 508. The wireless device 504 may transmit the UE capability as an LPP message, for example as part of an LPP capability exchange procedure. The network entity 508 may configure the validation configuration and/or the activation configuration based on the UE capability of the wireless device 504.

In some aspects, the server 520 may configure a validation configuration and/or an activation configuration for a set of positioning models at the wireless device 504. In some aspects, the server 520 may request a UE capability from the wireless device 504, and the server 520 may configure the validation configuration and/or the activation configuration based on the UE capability. In some aspects, the server 520 may be an OTT server that is managed and/or developed by a UE vendor or a UE chip vendor associated with the wireless device 504. The server 520 may store a set of positioning models for use at the wireless device 504, which may be staged and validated at the wireless device 504.

In some aspects, the wireless device 504 may act as a proxy for the server 520, such that the wireless device 504 relays communications between the network entity 508 and the server 520. In other words, the network entity 508 may transmit a request for UE capability from the wireless device 504, the wireless device 504 may then query the server 520 for a set of positioning models, each with capability requirements, and the wireless device 504 may report to the network entity 508 positioning models that may be staged at the wireless device 504 that are within the capability of the wireless device 504 to stage and validate. In some aspects, the server 520 may stage a portion of a positioning model. For example, the wireless device 504 may measure positioning signals and compute a portion of a positioning model at the wireless device 504, and outputs thereof may then be relayed to the server 520 to complete the calculation of positioning outputs at a portion of the positioning model that is at the server 520.

In some aspects, the network entity 508 may utilize validation of a positioning model at one wireless device for use of the positioning model at another wireless device. For example, the network entity 508 may configure a validation configuration for the wireless device 504 to stage and validate a positioning model. The wireless device 504 may indicate to the network entity 508 that the positioning model is valid, and in response the network entity 508 may configure one or more activation configurations for a plurality of wireless devices sharing at least one attribute (e.g., same UE vendor model, same area/region) with the wireless device 504 to use the validated positioning model.

Figure 6:
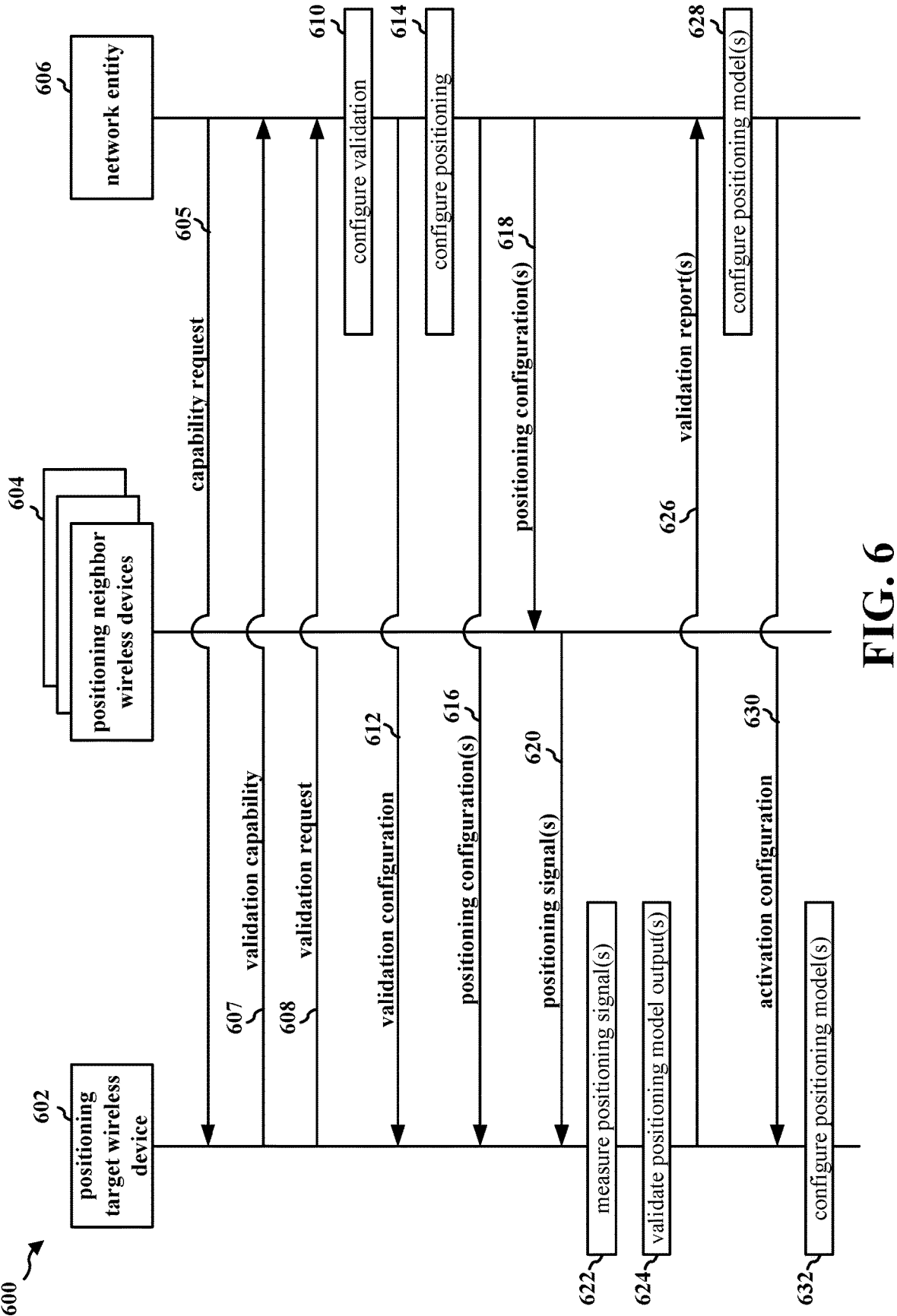
FIG. 6 is a connection flow diagram illustrating an example of a positioning target wireless device configured to indicate to a network entity of a positioning model ID registration failure.

FIG. 6 is a connection flow diagram 600 illustrating an example of a network entity 606 configured to configure validation of a set of positioning models for a positioning target wireless device 602. The positioning target wireless device 602 may be a UE or a PRU. The set of positioning neighbor wireless devices 604 may include a set of base stations and/or a set of TRPs. The network entity 606 may include an LMF, a set of location servers, or an over-the-top (OTT) location server. An OTT server may be a server that is managed and developed by a UE vendor and/or a UE chip vendor. The OTT server may not be part of a network, but may be configured to provide one or more positioning models to the positioning target wireless device 602. The OTT server may be configured to provide validation configurations to the positioning target wireless device 602.

The network entity 606 may transmit a capability request 605 to the positioning target wireless device 602. The positioning target wireless device 602 may receive the capability request 605 from the network entity 606. The network entity 606 may transmit an LPP message that includes the capability request 605, for example an LPP capability exchange message. The capability request 605 may indicate a request for the positioning target wireless device 602 to provide its capability to stage and validate a set of positioning models.

The positioning target wireless device 602 may transmit a validation capability 607 to the network entity 606. The positioning target wireless device 602 may transmit the validation capability 607 in response to receiving the capability request 605 from the network entity 606. The positioning target wireless device 602 may transmit the validation capability 607 in response to being configured to transmit its capability, for example being configured to periodically transmit the validation capability 607 or to transmit the validation capability 607 in response to an event (e.g., an estimate accuracy of positioning being less than or equal to a threshold value). The network entity 606 may receive the validation capability 607 from the positioning target wireless device 602. The positioning target wireless device 602 may transmit an LPP message that includes the validation capability 607, for example an LPP capability exchange message. In other words, the positioning target wireless device 602 may transmit the validation capability 607 as part of an LPP capability exchange procedure between the positioning target wireless device 602 and the network entity 606.

The validation capability 607 may include a UE capability of the positioning target wireless device 602. The validation capability 607 may include a set of indicators associated with the capability of the positioning target wireless device 602 to stage and validate a set of positioning models. The validation capability 607 may indicate a number of models that the positioning target wireless device 602 is capable of staging and validating. For example, the validation capability 607 may indicate that the positioning target wireless device 602 is capable of staging and validating a maximum of three positioning models for a set of positioning signals received by the positioning target wireless device 602. The validation capability 607 may indicate memory limits for the positioning target wireless device 602 to stage and validate a set of positioning models. For example, the validation capability 607 may indicate that the positioning target wireless device 602 is capable of allocating a maximum of 800 MB of memory towards staging and validating a set of positioning models at the positioning target wireless device 602. The validation capability 607 may indicate processing limits for the positioning target wireless device 602 to stage and validate a set of positioning models. For example, the validation capability 607 may indicate that the positioning target wireless device 602 is capable of allocating at most 20% of its processing power towards staging and validating a set of positioning models. The validation capability 607 may indicate processing/timing gap conditions for the positioning target wireless device 602 to stage and validate a set of positioning models. For example, the validation capability 607 may indicate minimum measurement gaps, processing gaps, and/or other timing gaps for staging and validating a set of positioning models. The validation capability 607 may indicate capabilities related to positioning resources that the positioning target wireless device 602 is capable of measuring. For example, the validation capability 607 may indicate that the positioning target wireless device 602 is capable of measuring a specified range of bandwidth resources for a maximum range of time.

The positioning target wireless device 602 may transmit a validation request 608 to the network entity 606. The network entity 606 may receive the validation request 608 from the positioning target wireless device 602. The validation request may include an indicator of a request for the positioning target wireless device 602 to validate a set of positioning models for use at the positioning target wireless device 602.

At 610, the network entity 606 may configure validation of a set of positioning models for the positioning target wireless device 602 based on the validation request 608. In some aspects, the network entity 606 may configure validation of a set of positioning models for the positioning target wireless device 602 without first receiving the validation request 608 (e.g., network-initiated validation). In some aspects, the network entity 606 may configure the validation based on the validation capability 607 received from the positioning target wireless device 602. For example, the network entity 606 may ensure that the number of positioning models is less than or equal to a maximum number of positioning models that the positioning target wireless device 602 indicated in the validation capability 607. In other words, the network entity 606 may configure the validation configuration to satisfy the conditions of the validation capability 607 of the positioning target wireless device 602. The network entity 606 may transmit a validation configuration 612 to the positioning target wireless device 602. The positioning target wireless device 602 may receive the validation configuration 612 from the network entity 606. The validation configuration 612 may include an indicator for the positioning target wireless device 602 to validate a set of positioning models at the positioning target wireless device 602 based on a set of validation conditions. The network entity 606 may transmit an LPP message that includes the validation configuration 612. For example, the network entity 606 may transmit an LPP provide location message, an LPP assistance data message, an LPP broadcast message, or an LPP posSIB that includes the validation configuration 612.

The validation configuration 612 may indicate how often the positioning target wireless device 602 should validate a set of positioning models (e.g., once every three hours, once every week). The validation configuration 612 may indicate the validation outcome to be calculated by the positioning target wireless device 602 (e.g., an error rate, an error amount, a distribution (mean, median) of errors, a statistical analysis of errors, a binary indication of whether the calculated error is greater or equal to a threshold amount). In other words, the validation configuration 612 may indicate to the positioning target wireless device 602 how to calculate an accuracy metric for each of the set of positioning models. The validation configuration 612 may indicate how the validation report is to be formatted and reported (e.g., which bits indicate which validation results). The validation configuration 612 may indicate positioning resources that the positioning target wireless device 602 should use for staging and validation (e.g., a BW range for measurements, a set of PRS IDs to be measured). The validation configuration 612 may indicate reporting aspects of the validation outcome, for example how often the positioning target wireless device 602 should transmit validation reports (e.g., collect measurements every 10 minutes and transmit a validation report every hour, transmit a validation report when the measured RSRP of a positioning signal is less than or equal to a threshold value). The validation configuration 612 may indicate a set of positioning model IDs associated with the set of positioning models to be staged and validated by the positioning target wireless device 602. The validation configuration 612 may indicate when the positioning target wireless device 602 should calculate, or request from a network entity (e.g., an OTT server), a set of positioning model outputs. The validation configuration 612 may indicate how the positioning target wireless device 602 should format the validation report. The validation configuration 612 may indicate when the positioning target wireless device 602 should transmit a validation report. The validation configuration 612 may indicate what event detected by the positioning target wireless device 602 should trigger transmission of the validation report.

At 614, the network entity 606 may configure positioning for the positioning target wireless device 602 and the set of positioning neighbor wireless devices 604. The configuration may include a configuration for the set of positioning neighbor wireless devices 604 to transmit a set of positioning signals 620 at the positioning target wireless device 602, and for the positioning target wireless device 602 to measure the set of positioning signals 620 received from the set of positioning neighbor wireless devices 604 for validating a set of positioning models. The configuration may include a configuration for the positioning target wireless device 602 to stage and validate one or more positioning models based on the validation configuration 612. The positioning configuration may indicate positioning resources that correspond with the positioning resources indicated in the validation configuration 612.

The network entity 606 may transmit a set of positioning configurations 616 at the positioning target wireless device 602. The positioning target wireless device 602 may receive the set of positioning configurations 616 from the network entity 606. The network entity may transmit a set of positioning configurations 618 at the set of positioning neighbor wireless devices 604. The set of positioning neighbor wireless devices 604 may receive the set of positioning configurations 618 from the network entity 606. The set of positioning neighbor wireless devices 604 may transmit the signals 620 at the positioning target wireless device 602 based on the set of positioning configurations 618 received from the network entity 606.

At 622, the positioning target wireless device 602 may measure the set of positioning signals 620. The positioning target wireless device 602 may measure the set of positioning signals 620 based on the set of positioning configurations 616. In some aspects, the positioning target wireless device 602 may measure the set of positioning signals 620 based on the validation configuration 612, for example by measuring positioning resources indicated in the validation configuration 612 (e.g., specified RSs, specified BWs).

At 624, the positioning target wireless device 602 may validate one or more positioning models based on the validation configuration 612. In other words, the positioning target wireless device 602 may stage a set of positioning models indicated by the validation configuration 612. The positioning target wireless device 602 may calculate a set of positioning outputs using each of the set of positioning models based on the measured positioning signals, and calculate a validation result based on the calculated set of positioning outputs. For example, the positioning target wireless device 602 may calculate an error rate for each of the set of positioning models based on the calculated set of positioning outputs and known labels for the positioning outputs (e.g., a known location, a known distance, a known LOS probability, a known TDoA).

In some aspects, the positioning target wireless device 602 may cooperate with network entity, for example an OTT server, to calculate the set of positioning outputs. For example, an OTT server may have a portion of a positioning model saved on its memory. The positioning target wireless device 602 may transmit measurements of positioning signals to the OTT server, which then feeds the measurements into a set of positioning models indicated by the positioning target wireless device 602 (based on the indicators of the validation configuration 612), which then calculates a set of positioning outputs that are transmitted back to the positioning target wireless device 602. In other words, the positioning target wireless device 602 may act as a proxy for the OTT server. Such an OTT server may assist in validation of a positioning model without the positioning target wireless device 602 staging the positioning model.

The positioning target wireless device 602 may transmit a set of validation reports 626 to the network entity 606. In some aspects, the positioning target wireless device 602 may transmit a single report that includes validation metrics for all positioning models tested at 624. In some aspects, the positioning target wireless device 602 may transmit one report for each of the positioning models validated at 624. The set of validation reports 626 may be formatted based on the indicators of the validation configuration 612, for example including an error distribution in response to the validation configuration 612 indicating that the positioning target wireless device 602 should indicate the error distribution of a positioning model. In some aspects, the set of validation reports 626 may include indicators of whether a positioning model has satisfied a set of validation conditions indicated by the validation configuration 612 (e.g., whether a set of positioning outputs is accurate within a degree of error). In some aspects, the set of validation reports 626 may include indicators of validation metrics indicated by the validation configuration 612 (e.g., an error distribution, statistics of error metrics calculated over time by the positioning target wireless device 602. The positioning target wireless device 602 may transmit the set of validation reports 626 based on the validation configuration 612, for example periodically transmitting the set of validation reports 626 based on a periodicity indicated by the validation configuration 612.

At 628, the network entity 606 may configure a set of positioning models at the positioning target wireless device 602 based on the set of validation reports 626. For example, the network entity 606 may indicate for the positioning target wireless device 602 to activate a positioning model, deactivate a positioning model, switch one positioning model for another one (e.g., activate a first positioning model and deactivate a second positioning model), or activate a plurality of positioning models. The network entity 606 may select positioning models for activation based on the results of validation reports (e.g., activating the top two positioning models having the lowest error rate). The network entity 606 may transmit an activation configuration 630 to the positioning target wireless device 602. The activation configuration 630 may also be referred to as an LCM configuration for a positioning model, or a set of positioning models. The positioning target wireless device 602 may receive the activation configuration 630 from the network entity 606. At 632, the positioning target wireless device 602 may configure a set of positioning models at the positioning target wireless device 602 based on the activation configuration 630, for example by activating a positioning model indicated by the activation configuration 630, deactivating a positioning model indicated by the activation configuration 630, or switching a first positioning model indicated by the activation configuration off and activating a second positioning model indicated by the activation configuration 630. The positioning target wireless device 602 may modify a previous LCM configuration of a positioning model based on the activation configuration 630 (e.g., increasing or decreasing the period of time a positioning model is active at the positioning target wireless device 602). In some aspects, the positioning target wireless device 602 may retrieve a set of positioning models from an OTT server based on the activation configuration 630. For example, if the OTT server calculated the positioning outputs for the validation test, the positioning target wireless device 602 may transmit a request for a set of positioning models from the OTT server based on the activation configuration 630, and the OTT server may then transmit the set of positioning models to the positioning target wireless device 602 for use at the positioning target wireless device 602.

Figure 7:
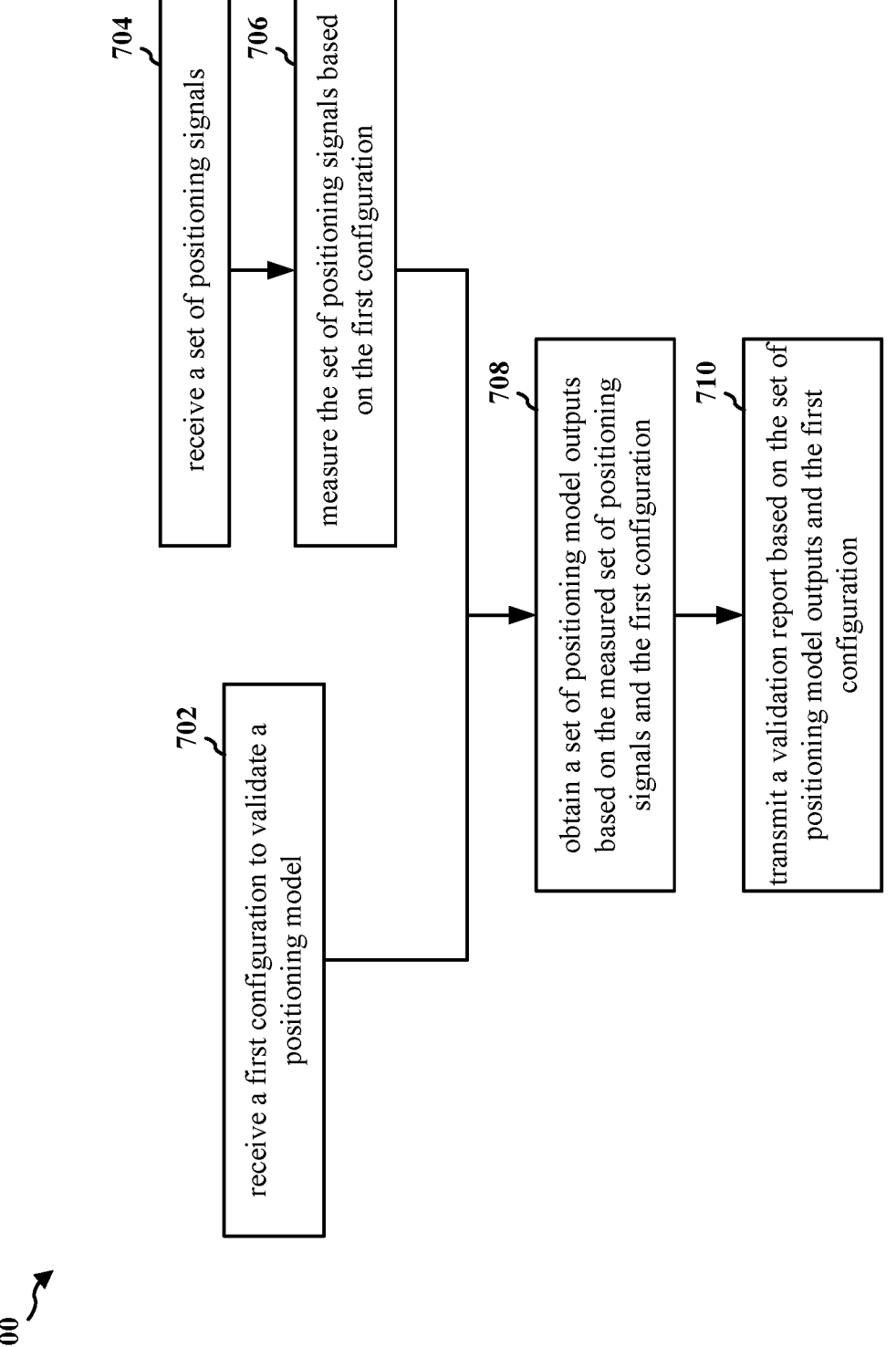
FIG. 7 is a flowchart of a method of wireless communication.

FIG. 7 is a flowchart 700 of a method of wireless communication. The method may be performed by a UE (e.g., the UE 104, the UE 350; the wireless device 404, the wireless device 504, the positioning target wireless device 602; the apparatus 904). At 702, the UE may receive a first configuration to validate a positioning model. For example, 702 may be performed by the positioning target wireless device 602 in FIG. 6, which may receive the validation configuration 612 from the network entity 606. The validation configuration 612 may include an indicator for the positioning target wireless device 602 to validate a set of positioning models. Moreover, 702 may be performed by the component 198 in FIG. 1, 3, or 9.

At 704, the UE may receive a set of positioning signals. For example, 704 may be performed by the positioning target wireless device 602 in FIG. 6, which may receive the set of positioning signals 620 from the set of positioning neighbor wireless devices 604. The set of positioning signals 620 may include, for example, PRS, SRS, or SSB. Moreover, 704 may be performed by the component 198 in FIG. 1, 3, or 9.

At 706, the UE may measure the set of positioning signals based on the first configuration. For example, 706 may be performed by the positioning target wireless device 602 in FIG. 6, which may, at 622, measure the set of positioning signals 620 based on the validation configuration 612. Moreover, 706 may be performed by the component 198 in FIG. 1, 3, or 9.

At 708, the UE may obtain a set of positioning model outputs based on the measured set of positioning signals and the first configuration. For example, 708 may be performed by the positioning target wireless device 602 in FIG. 6, which may, at 624, obtain a set of positioning model outputs based on the measured set of positioning signals and the validation configuration 612. In one example, the positioning target wireless device 602 may stage a set of positioning models indicated by the validation configuration 612, and may calculate a set of positioning model outputs for each staged positioning model. In another example, the positioning target wireless device 602 may cooperate with an OTT server to stage the set of positioning models indicated by the validation configuration 612, and may receive a set of positioning model outputs for each staged positioning model from the OTT server. Moreover, 708 may be performed by the component 198 in FIG. 1, 3, or 9.

At 710, the UE may transmit a validation report based on the set of positioning model outputs and the first configuration. For example, 710 may be performed by the positioning target wireless device 602 in FIG. 6, which may transmit a set of validation reports 626 to the network entity 606 based on the set of positioning model outputs and the validation configuration 612. Moreover, 710 may be performed by the component 198 in FIG. 1, 3, or 9.

Figure 8:
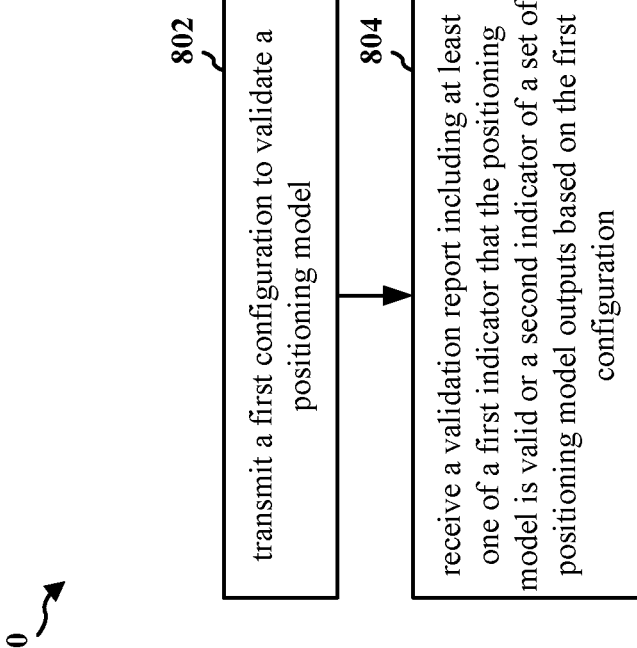
FIG. 8 is a flowchart of a method of wireless communication.

FIG. 8 is a flowchart 800 of a method of wireless communication. The method may be performed by a network entity (e.g., the base station 102, the base station 310; the wireless device 402, the wireless device 406, the wireless device 502, the wireless device 506, the network entity 508, the server 520; the network entity 606, the network entity 902, the network entity 1002, the network entity 1160). At 802, the network entity may transmit a first configuration to validate a positioning model. For example, 802 may be performed by the network entity 606 in FIG. 6, which may transmit the validation configuration 612 to the positioning target wireless device 602. The validation configuration 612 may include an indicator for the positioning target wireless device 602 to validate a set of positioning models. Moreover, 802 may be performed by the component 199 in FIG. 1, 3, 10, or 11.

At 804, the network entity may receive a validation report including at least one of a first indicator that the positioning model is valid or a second indicator of a set of positioning model outputs based on the first configuration. For example, 804 may be performed by the network entity 606 in FIG. 6, which may receive a set of validation reports 626 from the positioning target wireless device 602. The set of validation reports 626 may include at least one of a first indicator that the positioning model is valid or a second indicator of a set of positioning model outputs based on the first configuration. Moreover, 804 may be performed by the component 199 in FIG. 1, 3, 10, or 11.

Figure 9:
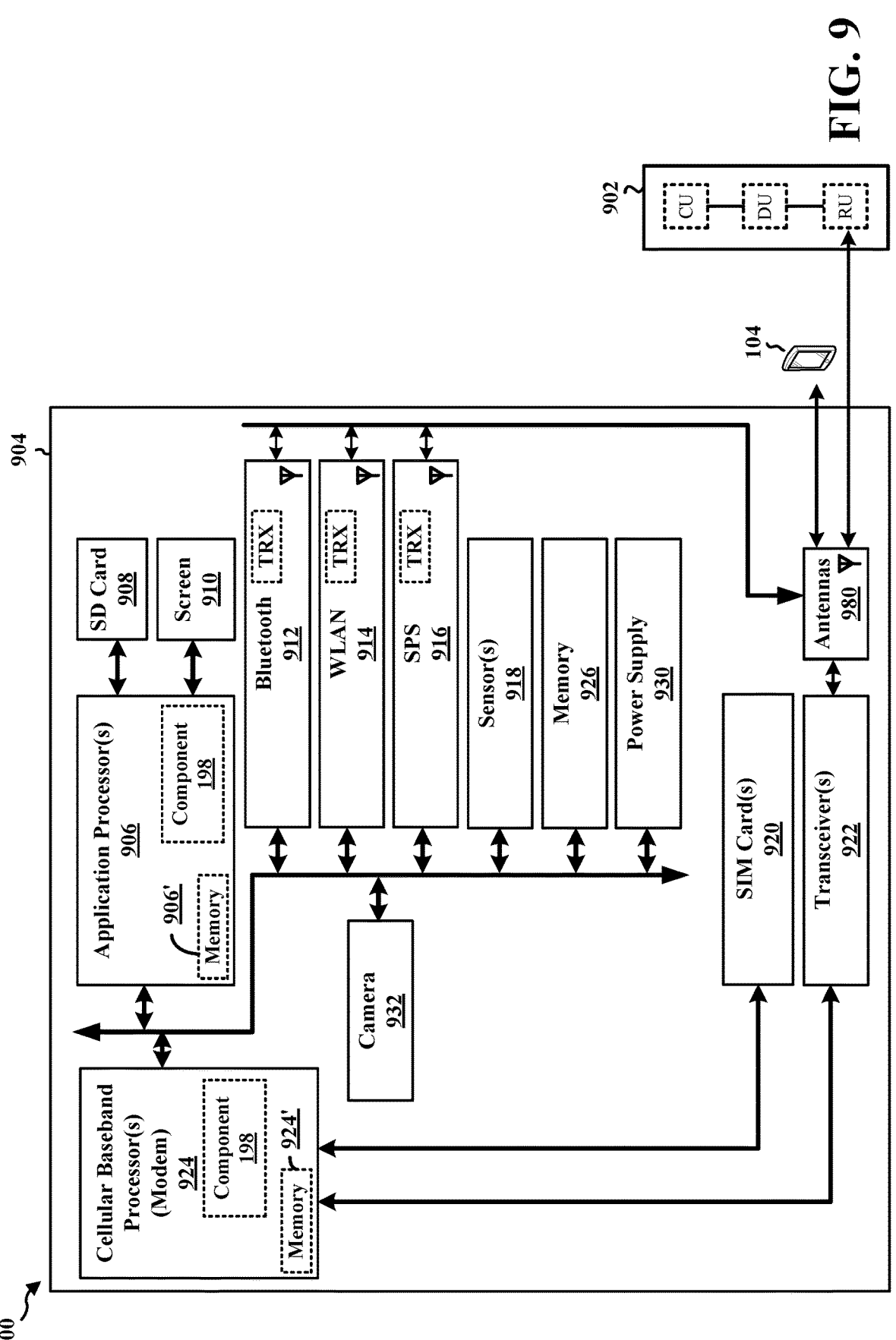
FIG. 9 is a diagram illustrating an example of a hardware implementation for an example apparatus and/or network entity.

FIG. 9 is a diagram 900 illustrating an example of a hardware implementation for an apparatus 904. The apparatus 904 may be a UE, a component of a UE, or may implement UE functionality. In some aspects, the apparatus 904 may include at least one cellular baseband processor 924 (also referred to as a modem) coupled to one or more transceivers 922 (e.g., cellular RF transceiver). The cellular baseband processor(s) 924 may include at least one on-chip memory 924'. In some aspects, the apparatus 904 may further include one or more subscriber identity modules (SIM) cards 920 and at least one application processor 906 coupled to a secure digital (SD) card 908 and a screen 910. The application processor(s) 906 may include on-chip memory 906'. In some aspects, the apparatus 904 may further include a Bluetooth module 912, a WLAN module 914, an SPS module 916 (e.g., GNSS module), one or more sensor modules 918 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 926, a power supply 930, and/or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas and/or utilize the antennas 980 for communication. The cellular baseband processor(s) 924 communicates through the transceiver(s) 922 via one or more antennas 980 with the UE 104 and/or with an RU associated with a network entity 902. The cellular baseband processor(s) 924 and the application processor(s) 906 may each include a computer-readable medium/memory 924', 906', respectively. The additional memory modules 926 may also be considered a computer-readable medium/memory. Each computer-readable medium 924', 906', 926 may be non-transitory. The cellular baseband processor(s) 924 and the application processor(s) 906 are each responsible for general processing, including the execution of software stored on the computer-readable medium/memory. The software, when executed by the cellular baseband processor(s) 924/application processor(s) 906, causes the cellular baseband processor(s) 924/application processor(s) 906 to perform the various functions described supra. The cellular baseband processor(s) 924 and the application processor(s) 906 are configured to perform the various functions described supra based at least in part of the information stored in the memory. That is, the cellular baseband processor(s) 924 and the application processor(s) 906 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 924/application processor(s) 906 when executing software. The cellular baseband processor(s) 924/application processor(s) 906 may be a component of the UE 350 and may include the at least one memory 360 and/or at least one of the TX processor 368, the RX processor 356, and the controller/processor 359. In one configuration, the apparatus 904 may be at least one processor chip (modem and/or application) and include just the cellular baseband processor(s) 924 and/or the application processor(s) 906, and in another configuration, the apparatus 904 may be the entire UE (e.g., sec UE 350 of FIG. 3) and include the additional modules of the apparatus 904.

As discussed supra, the component 198 may be configured to receive a first configuration to validate a positioning model. The component 198 may be configured to receive a set of positioning signals. The component 198 may be configured to measure the set of positioning signals based on the first configuration. The component 198 may be configured to obtain a set of positioning model outputs based on the measured set of positioning signals and the first configuration. The component 198 may be configured to obtain the set of positioning model outputs based on the measured set of positioning signals and the first configuration by calculating the set of positioning model outputs based on the measured set of positioning signals and the first configuration using the positioning model. The component 198 may be configured to obtain the set of positioning model outputs based on the measured set of positioning signals and the first configuration by transmitting the measured set of positioning signals based on the first configuration and by receiving the set of positioning model outputs based on the transmitted measured set of positioning signals and the positioning model. The component 198 may be configured to transmit a validation report based on the set of positioning model outputs and the first configuration. The component 198 may be within the cellular baseband processor(s) 924, the application processor(s) 906, or both the cellular baseband processor(s) 924 and the application processor(s) 906. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 904 may include a variety of components configured for various functions. In one configuration, the apparatus 904, and in particular the cellular baseband processor(s) 924 and/or the application processor(s) 906, may include means for receiving a first configuration to validate a positioning model. The apparatus 904 may include means for receiving a first configuration to validate a positioning model. The apparatus 904 may include means for receiving a set of positioning signals. The apparatus 904 may include means for measuring the set of positioning signals based on the first configuration. The apparatus 904 may include means for obtaining a set of positioning model outputs based on the measured set of
positioning signals and the first configuration. The apparatus
904 may include means for transmitting a validation report
based on the set of positioning model outputs and the first
configuration. The apparatus 904 may include means for
obtaining the set of positioning model outputs based on the
measured set of positioning signals and the first configura-
tion by calculating the set of positioning model outputs
based on the measured set of positioning signals and the first
configuration using the positioning model. The apparatus
904 may include means for obtaining the set of positioning
model outputs based on the measured set of positioning
signals and the first configuration by (a) transmitting the
measured set of positioning signals based on the first con-
figuration and (b) receiving the set of positioning model
outputs based on the transmitted measured set of positioning
signals and the positioning model. The apparatus 904 may
include means for transmitting a second configuration to
calculate the set of positioning model outputs based on the
measured set of positioning signals and the first configura-
tion before the transmission of the measured set of position-
ing signals. The first configuration may include at least one
of (a) a first indicator of a first schedule for when to obtain
the set of positioning model outputs, (b) a second indicator
of a first event that triggers the obtainment of the set of
positioning model outputs, (c) a third indicator of how to
format the validation report based on the set of positioning
model outputs, (d) a fourth indicator of a set of resources to
use for the measurement of the set of positioning signals, (e)
a fifth indicator of a second schedule of when to transmit the
validation report, (f) a sixth indicator of a second event that
triggers the transmission of the validation report, or (g) a
seventh indicator of the positioning model. The apparatus
904 may include means for receiving a second configuration
to modify a positioning model configuration for LCM of the
positioning model at the apparatus 904. The apparatus 904
may include means for modifying the positioning model
configuration based on the second configuration. The second
configuration may include at least one of (a) a first indicator
to activate the positioning model for a calculation of a
second set of positioning model outputs, (b) a second
indicator to deactivate a second positioning model for the
calculation of the second set of positioning model outputs,
or (c) a third indicator to switch between using the posi-
tioning model or the second positioning model for the
calculation of the second set of positioning model outputs.
The apparatus 904 may include means for receiving the
second configuration by receiving an LPP message includ-
ing the second configuration. The LPP message may include
at least one of (a) an LPP provide location message, (b) an
LPP assistance data message, (c) an LPP broadcast message,
(d) or a posSIB message. The apparatus 904 may include
means for receiving the first configuration by receiving an
LPP message including the first configuration. The LPP
message may include at least one of (a) an LPP provide
location message, (b) an LPP assistance data message, (c) an
LPP broadcast message, or (d) a posSIB message. The
apparatus 904 may include means for calculating an accu-
racy metric of the positioning model by comparing the set of
positioning model outputs to a set of expected outputs. The
validation report may include an indicator of the calculated
accuracy metric. The apparatus 904 may include means for
calculating the set of expected outputs based on the mea-
sured set of positioning signals using a second positioning
model. The apparatus 904 may include means for receiving
the set of expected outputs before the calculation of the
accuracy metric. The apparatus 904 may include means for transmitting a capability message. The capability message
may include an indicator that the apparatus 904 is configured
to validate the positioning model before the reception of the
first configuration. The capability message may include a set
of capability conditions for the apparatus 904 to validate a
set of positioning models before the reception of the first
configuration. The first configuration may satisfy the set of
capability conditions (e.g., within the bounds of a minimum
and a maximum BW). The set of capability conditions may
include at least one of (a) a first indicator of a maximum
number of positioning models that the apparatus 904 is
configured to simultaneously stage in order for the apparatus
904 to validate the set of positioning models, (b) a second
indicator of a first maximum amount of memory that the
apparatus 904 is configured to use in order for the apparatus
904 to validate the set of positioning models, (c) a third
indicator of a second maximum amount of processing power
that the apparatus 904 is configured to use in order for the
apparatus 904 to validate the set of positioning models, (d)
a fourth indicator of a set of timing gaps used by the
apparatus 904 in order for the apparatus 904 to validate the
set of positioning models, (c) or a fifth indicator of a set of
resource conditions associated with each of the set of
positioning models. The apparatus 904 may include means
for receiving a request for the capability message. The
transmission of the capability message may be in response
to the request. The capability message may include an LPP
message including the capability message. The LPP message
may include an LPP capability exchange message. The
means may be the component 198 of the apparatus 904
configured to perform the functions recited by the means. As
described supra, the apparatus 904 may include the TX
processor 368, the RX processor 356, and the controller/
processor 359. As such, in one configuration, the means may
be the TX processor 368, the RX processor 356, and/or the
controller/processor 359 configured to perform the functions
recited by the means.

Figure 10:
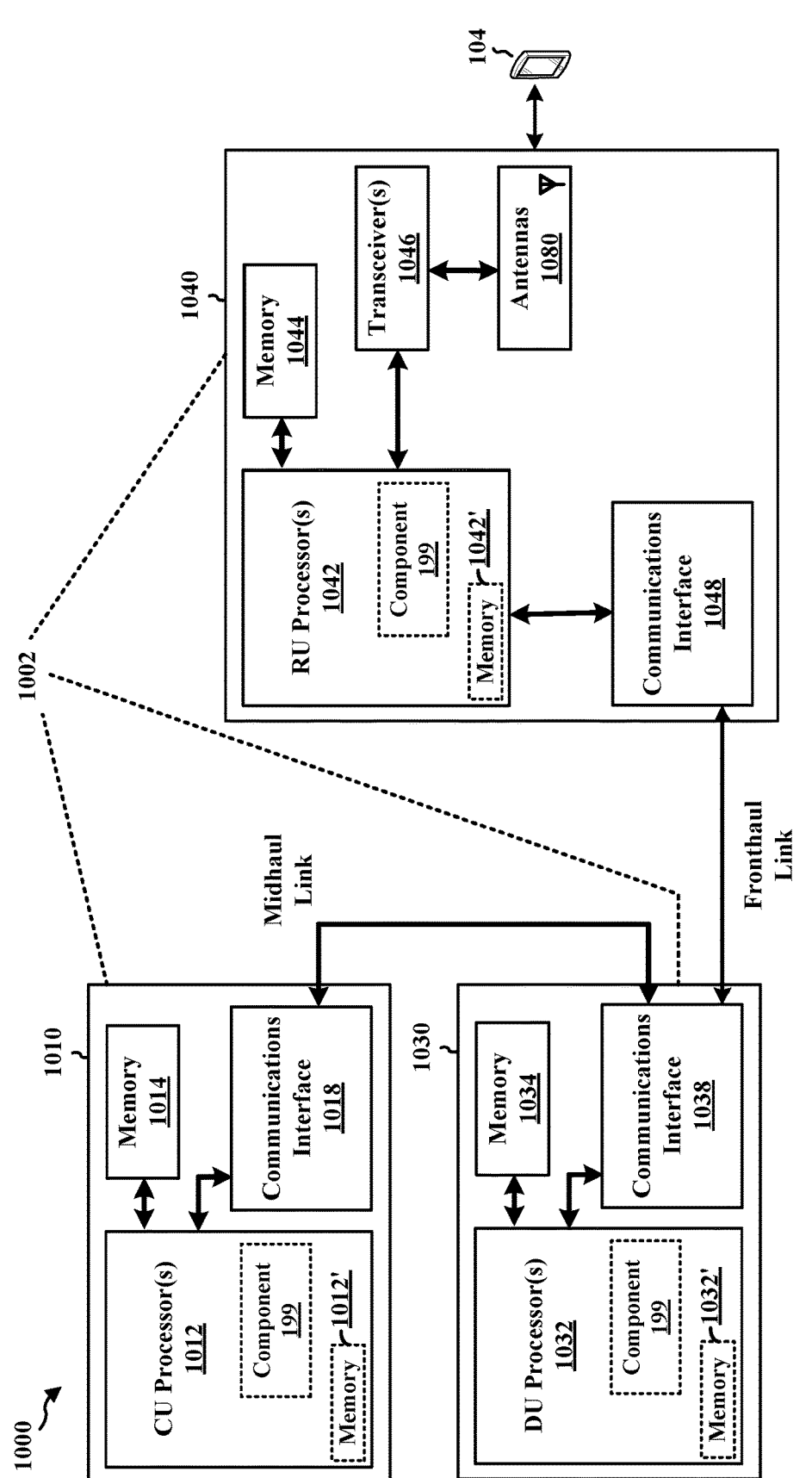
FIG. 10 is a diagram illustrating an example of a hardware implementation for an example network entity.

FIG. 10 is a diagram 1000 illustrating an example of a
hardware implementation for a network entity 1002. The
network entity 1002 may be a BS, a component of a BS, or
may implement BS functionality. The network entity 1002
may include at least one of a CU 1010, a DU 1030, or an RU
1040. For example, depending on the layer functionality
handled by the component 199, the network entity 1002 may
include the CU 1010; both the CU 1010 and the DU 1030;
each of the CU 1010, the DU 1030, and the RU 1040; the
DU 1030; both the DU 1030 and the RU 1040; or the RU
1040. The CU 1010 may include at least one CU processor
1012. The CU processor(s) 1012 may include on-chip
memory 1012'. In some aspects, the CU 1010 may further
include additional memory modules 1014 and a communi-
cations interface 1018. The CU 1010 communicates with the
DU 1030 through a midhaul link, such as an F1 interface.
The DU 1030 may include at least one DU processor 1032.
The DU processor(s) 1032 may include on-chip memory
1032'. In some aspects, the DU 1030 may further include
additional memory modules 1034 and a communications
interface 1038. The DU 1030 communicates with the RU
1040 through a fronthaul link. The RU 1040 may include at
least one RU processor 1042. The RU processor(s) 1042
may include on-chip memory 1042'. In some aspects, the RU
1040 may further include additional memory modules 1044,
one or more transceivers 1046, antennas 1080, and a com-
munications interface 1048. The RU 1040 communicates
with the UE 104. The on-chip memory 1012', 1032', 1042'
and the additional memory modules 1014, 1034, 1044 may
each be considered a computer-readable medium/memory.

Each computer-readable medium/memory may be non-transitory. Each of the processors 1012, 1032, 1042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit a first configuration to validate a positioning mode. The component 199 may be configured to receive a validation report. The validation report may include at least one of a first indicator that the positioning model is valid or a second indicator of a set of positioning model outputs based on the first configuration. The component 199 may be within one or more processors of one or more of the CU 1010, DU 1030, and the RU 1040. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1002 may include a variety of components configured for various functions. In one configuration, the network entity 1002 may include means for transmitting a first configuration to validate a positioning mode. The network entity 1002 may include means for receiving a validation report. The validation report may include at least one of a first indicator that the positioning model is valid or a second indicator of a set of positioning model outputs based on the first configuration. The first configuration may include at least one of, (a) a third indicator of a first schedule for when to obtain the set of positioning model outputs, (b) a fourth indicator of a first event that triggers the validation of the positioning model, (c) a fifth indicator of how to format the validation report, (d) a sixth indicator of a set of resources to use for the validation of the positioning model, (e) a seventh indicator of a second schedule of when to transmit the validation report, (f) an eighth indicator of a second event that triggers a transmission of the validation report, or (g) a ninth indicator of the positioning model. The network entity 1002 may include means for transmitting a second configuration to modify a positioning model configuration for LCM of the positioning model at a UE (e.g., the UE 104) based on the validation report. The second configuration may include at least one of (a) a third indicator to activate the positioning model for a calculation of a second set of positioning model outputs, (b) a fourth indicator to deactivate a second positioning model for the calculation of the second set of positioning model outputs, or (c) a fifth indicator to switch between using the positioning model or the second positioning model for the calculation of the second set of positioning model outputs. The network entity 1002 may include means for transmitting the second configuration by transmitting an LPP message including the second configuration. The LPP message may include at least one of (a) an LPP provide location message, (b) an LPP assistance data message, (c) an LPP broadcast message, (d) or a posSIB message. The network entity 1002 may include means for receiving the validation report by receiving the validation report from the UE. The network entity 1002 may include means for transmitting the second configuration by transmitting the second configuration to the UE. The network entity 1002 may include means for receiving the validation report by receiving the validation report from a second UE different from the UE. The network entity 1002 may include means for transmitting the second configuration by transmitting the second configuration to the UE. The network entity 1002 may include means for transmitting the first configuration by transmitting an LPP message including the first configuration. The LPP message may include at least one of (a) an LPP provide location message, (b) an LPP assistance data message, (c) an LPP broadcast message, (d) or a posSIB message. The first configuration may include a third indicator to validate the positioning model based on a set of expected outputs calculated based on a second positioning model. The network entity 1002 may include means for transmitting the set of expected outputs before the reception of the validation report. The network entity 1002 may include means for calculating the set of expected outputs before the transmission of the set of expected outputs. The network entity 1002 may include means for receiving a capability message including an indicator that a UE is configured to validate the positioning model. The transmission of the first configuration may be in response to the capability message. The capability message may include a set of capability conditions for the UE to validate a set of positioning models before the reception of the first configuration. The network entity 1002 may include means for configuring the first configuration to satisfy the set of capability conditions before the transmission of the first configuration. The set of capability conditions may include at least one of: a third indicator of a maximum number of positioning models that the UE is configured to simultaneously stage for the UE to validate the set of positioning models; a fourth indicator of a first maximum amount of memory that the UE is configured to use for the UE to validate the set of positioning models; a fifth indicator of a second maximum amount of processing power that the UE is configured to use for the UE to validate the set of positioning models; a sixth indicator of a set of timing gaps used by the UE for the UE to validate the set of positioning models; or a seventh indicator of a set of resource conditions associated with each of the set of positioning models. The network entity 1002 may include means for transmitting a request for the capability message before the reception of the capability message. The capability message may be received as an LPP message including the capability message. The LPP message may include an LPP capability exchange message. The network entity 1002 may include at least one of an LMF or an OTT location server. The means may be the component 199 of the network entity 1002 configured to perform the functions recited by the means. As described supra, the network entity 1002 may include the TX processor 316, the RX processor 370, and the controller/processor 375. As such, in one configuration, the means may be the TX processor 316, the RX processor 370, and/or the controller/processor 375 configured to perform the functions recited by the means.

Figure 11:
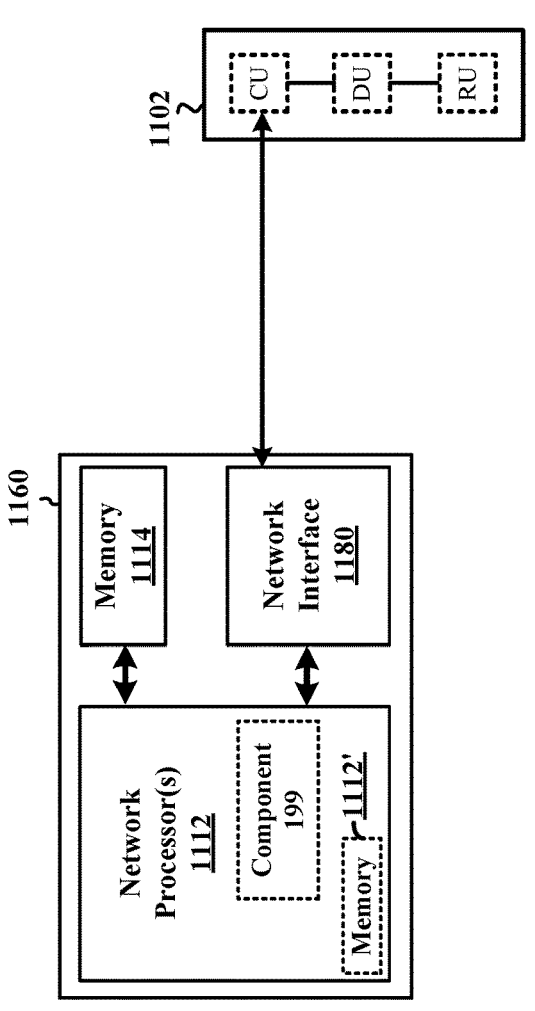
FIG. 11 is a diagram illustrating an example of a hardware implementation for an example network entity.

FIG. 11 is a diagram 1100 illustrating an example of a hardware implementation for a network entity 1160. In one example, the network entity 1160 may be within the core network 120. The network entity 1160 may include at least one network processor 1112. The network processor(s) 1112 may include on-chip memory 1112'. In some aspects, the network entity 1160 may further include additional memory modules 1114. The network entity 1160 communicates via the network interface 1180 directly (e.g., backhaul link) or indirectly (e.g., through a RIC) with the CU 1102. The on-chip memory 1112' and the additional memory modules 1114 may each be considered a computer-readable medium/memory. Each computer-readable medium/memory may be non-transitory. The network processor(s) 1112 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit a first configuration to validate a positioning mode. The component 199 may be configured to receive a validation report. The validation report may include at least one of a first indicator that the positioning model is valid or a second indicator of a set of positioning model outputs based on the first configuration. The component 199 may be within the network processor(s) 1112. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1160 may include a variety of components configured for various functions. In one configuration, the network entity 1160 may include means for transmitting a first configuration to validate a positioning mode. The network entity 1160 may include means for receiving a validation report. The validation report may include at least one of a first indicator that the positioning model is valid or a second indicator of a set of positioning model outputs based on the first configuration. The first configuration may include at least one of, (a) a third indicator of a first schedule for when to obtain the set of positioning model outputs, (b) a fourth indicator of a first event that triggers the validation of the positioning model, (c) a fifth indicator of how to format the validation report, (d) a sixth indicator of a set of resources to use for the validation of the positioning model, (c) a seventh indicator of a second schedule of when to transmit the validation report, (f) an eighth indicator of a second event that triggers a transmission of the validation report, or (g) a ninth indicator of the positioning model. The network entity 1160 may include means for transmitting a second configuration to modify a positioning model configuration for LCM of the positioning model at a UE (e.g., the UE 104) based on the validation report. The second configuration may include at least one of (a) a third indicator to activate the positioning model for a calculation of a second set of positioning model outputs, (b) a fourth indicator to deactivate a second positioning model for the calculation of the second set of positioning model outputs, or (c) a fifth indicator to switch between using the positioning model or the second positioning model for the calculation of the second set of positioning model outputs. The network entity 1160 may include means for transmitting the second configuration by transmitting an LPP message including the second configuration. The LPP message may include at least one of (a) an LPP provide location message, (b) an LPP assistance data message, (c) an LPP broadcast message, (d) or a posSIB message. The network entity 1160 may include means for receiving the validation report by receiving the validation report from the UE. The network entity 1160 may include means for transmitting the second configuration by transmitting the second configuration to the UE. The network entity 1160 may include means for receiving the validation report by receiving the validation report from a second UE different from the UE. The network entity 1160 may include means for transmitting the second configuration by transmitting the second configuration to the UE. The network entity 1160 may include means for transmitting the first configuration by transmitting an LPP message including the first configuration. The LPP message may include at least one of (a) an LPP provide location message, (b) an LPP assistance data message, (c) an LPP broadcast message, (d) or a posSIB message. The first configuration may include a third indicator to validate the positioning model based on a set of expected outputs calculated based on a second positioning model. The network entity 1160 may include means for transmitting the set of expected outputs before the reception of the validation report. The network entity 1160 may include means for calculating the set of expected outputs before the transmission of the set of expected outputs. The network entity 1160 may include means for receiving a capability message including an indicator that a UE is configured to validate the positioning model. The transmission of the first configuration may be in response to the capability message. The capability message may include a set of capability conditions for the UE to validate a set of positioning models before the reception of the first configuration. The network entity 1160 may include means for configuring the first configuration to satisfy the set of capability conditions before the transmission of the first configuration. The set of capability conditions may include at least one of: a third indicator of a maximum number of positioning models that the UE is configured to simultaneously stage for the UE to validate the set of positioning models; a fourth indicator of a first maximum amount of memory that the UE is configured to use for the UE to validate the set of positioning models; a fifth indicator of a second maximum amount of processing power that the UE is configured to use for the UE to validate the set of positioning models; a sixth indicator of a set of timing gaps used by the UE for the UE to validate the set of positioning models; or a seventh indicator of a set of resource conditions associated with each of the set of positioning models. The network entity 1160 may include means for transmitting a request for the capability message before the reception of the capability message. The capability message may be received as an LPP message including the capability message. The LPP message may include an LPP capability exchange message. The network entity 1160 may include at least one of an LMF or an OTT location server. The means may be the component 199 of the network entity 1160 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a component of the device that transmits the data. A device configured to "obtain" data, such as a transmission, signal, or message, may receive, for example with a transceiver, or may obtain the data from a component of the device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: receiving a first configuration to validate a positioning model; receiving a set of positioning signals; measuring the set of positioning signals based on the first configuration; obtaining a set of positioning model outputs based on the measured set of positioning signals and the first configuration; and transmitting a validation report based on the set of positioning model outputs and the first configuration.

Aspect 2 is the method of aspect 1, wherein obtaining the set of positioning model outputs based on the measured set of positioning signals and the first configuration comprises calculating the set of positioning model outputs based on the measured set of positioning signals and the first configuration using the positioning model.

Aspect 3 is the method of either of aspects 1 or 2, wherein obtaining the set of positioning model outputs based on the measured set of positioning signals and the first configuration comprises: transmitting the measured set of positioning signals based on the first configuration; and receiving the set of positioning model outputs based on the transmitted measured set of positioning signals and the positioning model.

Aspect 4 is the method of aspect 3, further comprising: transmitting a second configuration to calculate the set of positioning model outputs based on the measured set of positioning signals and the first configuration before the transmission of the measured set of positioning signals.

Aspect 5 is the method of any of aspects 1 to 4, wherein the first configuration comprises at least one of: a first indicator of a first schedule for when to obtain the set of positioning model outputs; a second indicator of a first event that triggers the obtainment of the set of positioning model outputs; a third indicator of how to format the validation report based on the set of positioning model outputs; a fourth indicator of a set of resources to use for the measurement of the set of positioning signals; a fifth indicator of a second schedule of when to transmit the validation report; a sixth indicator of a second event that triggers the transmission of the validation report; or a seventh indicator of the positioning model.

Aspect 6 is the method of any of aspects 1 to 5, further comprising: receiving a second configuration to modify a positioning model configuration for life cycle management (LCM) of the positioning model at the UE; and modifying the positioning model configuration based on the second configuration.

Aspect 7 is the method of aspect 6, wherein the second configuration comprises at least one of: a first indicator to activate the positioning model for a calculation of a second set of positioning model outputs; a second indicator to deactivate a second positioning model for the calculation of the second set of positioning model outputs; or a third indicator to switch between using the positioning model or the second positioning model for the calculation of the second set of positioning model outputs.

Aspect 8 is the method of either of aspects 6 or 7, wherein receiving the second configuration comprises receiving a long-term evolution (LTE) positioning protocol (LPP) message comprising the second configuration.

Aspect 9 is the method of aspect 8, wherein the LPP message comprises at least one of: an LPP provide location message; an LPP assistance data message; an LPP broadcast message; or a positioning system information block (posSIB) message.

Aspect 10 is the method of any of aspects 1 to 9, wherein receiving the first configuration comprises receiving a long-term evolution (LTE) positioning protocol (LPP) message comprising the first configuration.

Aspect 11 is the method of aspect 10, wherein the LPP message comprises at least one of: an LPP provide location message; an LPP assistance data message; an LPP broadcast message; or a positioning system information block (posSIB) message.

Aspect 12 is the method of any of aspects 1 to 11, further comprising calculating an accuracy metric of the positioning model by comparing the set of positioning model outputs to a set of expected outputs, wherein the validation report comprises an indicator of the calculated accuracy metric.

Aspect 13 is the method of aspect 12, further comprising calculating the set of expected outputs based on the measured set of positioning signals using a second positioning model.

Aspect 14 is the method of either of aspects 12 or 13, further comprising receiving the set of expected outputs before the calculation of the accuracy metric.

Aspect 15 is the method of any of aspects 1 to 14, further comprising transmitting a capability message comprising an indicator that the UE is configured to validate the positioning model before the reception of the first configuration.

Aspect 16 is the method of aspect 15, wherein the capability message further comprises a set of capability conditions for the UE to validate a set of positioning models before the reception of the first configuration, wherein the first configuration satisfies the set of capability conditions, wherein the set of capability conditions comprise at least one of: a first indicator of a maximum number of positioning models that the UE is configured to simultaneously stage for the UE to validate the set of positioning models; a second indicator of a first maximum amount of memory that the UE is configured to use for the UE to validate the set of positioning models; a third indicator of a second maximum amount of processing power that the UE is configured to use for the UE to validate the set of positioning models; a fourth indicator of a set of timing gaps used by the UE for the UE to validate the set of positioning models; or a fifth indicator of a set of resource conditions associated with each of the set of positioning models.

Aspect 17 is the method of either of aspects 15 or 16, further comprising receiving a request for the capability message, wherein the transmission of the capability message is in response to the request.

Aspect 18 is the method of any of aspects 15 to 17, wherein the capability message comprises a long-term evolution (LTE) positioning protocol (LPP) message comprising the capability message.

Aspect 19 is the method of aspect 18, wherein the LPP message comprises an LPP capability exchange message.

Aspect 20 is a method of wireless communication at a network entity, comprising: transmitting a first configuration to validate a positioning model; and receiving a validation report comprising at least one of a first indicator that the positioning model is valid or a second indicator of a set of positioning model outputs based on the first configuration.

Aspect 21 is the method of aspect 20, wherein the first configuration comprises at least one of: a third indicator of a first schedule for when to obtain the set of positioning model outputs; a fourth indicator of a first event that triggers the validation of the positioning model; a fifth indicator of how to format the validation report; a sixth indicator of a set of resources to use for the validation of the positioning model; a seventh indicator of a second schedule of when to transmit the validation report; an eighth indicator of a second event that triggers a transmission of the validation report; or a ninth indicator of the positioning model.

Aspect 22 is the method of either of aspects 20 or 21, further comprising transmitting a second configuration to modify a positioning model configuration for life cycle management (LCM) of the positioning model at a user equipment (UE) based on the validation report.

Aspect 23 is the method of aspect 22, wherein the second configuration comprises at least one of: a third indicator to activate the positioning model for a calculation of a second set of positioning model outputs; a fourth indicator to deactivate a second positioning model for the calculation of the second set of positioning model outputs; or a fifth indicator to switch between using the positioning model or the second positioning model for the calculation of the second set of positioning model outputs.

Aspect 24 is the method of either of aspects 22 or 23, wherein transmitting the second configuration comprises: transmitting a long-term evolution (LTE) positioning protocol (LPP) message comprising the second configuration.

Aspect 25 is the method of aspect 24, wherein the LPP message comprises at least one of: an LPP provide location message; an LPP assistance data message; an LPP broadcast message; or a positioning system information block (posSIB) message.

Aspect 26 is the method of any of aspects 22 to 25, wherein receiving the validation report comprises receiving the validation report from the UE, wherein transmitting the second configuration comprises transmitting the second configuration to the UE.

Aspect 27 is the method of any of aspects 22 to 26, wherein receiving the validation report comprises receiving the validation report from a second UE different from the UE, wherein transmitting the second configuration comprises transmitting the second configuration to the UE.

Aspect 28 is the method of any of aspects 20 to 27, wherein transmitting the first configuration comprises: transmitting a long-term evolution (LTE) positioning protocol (LPP) message comprising the first configuration.

Aspect 29 is the method of aspect 28, wherein the LPP message comprises at least one of: an LPP provide location message; an LPP assistance data message; an LPP broadcast message; or a positioning system information block (posSIB) message.

Aspect 30 is the method of any of aspects 22 to 29, wherein the first configuration comprises a third indicator to validate the positioning model based on a set of expected outputs calculated based on a second positioning model.

Aspect 31 is the method of aspect 30, further comprising transmitting the set of expected outputs before the reception of the validation report.

Aspect 32 is the method of aspect 31, further comprising calculating the set of expected outputs before the transmission of the set of expected outputs.

Aspect 33 is the method of any of aspects 22 to 32, further comprising: receiving a capability message comprising an indicator that a user equipment (UE) is configured to validate the positioning model, wherein the transmission of the first configuration is in response to the capability message.

Aspect 34 is the method of aspect 33, wherein the capability message further comprises a set of capability conditions for the UE to validate a set of positioning models before the reception of the first configuration, further comprising: configuring the first configuration to satisfy the set of capability conditions before the transmission of the first configuration.

Aspect 35 is the method of aspect 34, wherein the set of capability conditions comprise at least one of: a third indicator of a maximum number of positioning models that the UE is configured to simultaneously stage for the UE to validate the set of positioning models; a fourth indicator of a first maximum amount of memory that the UE is configured to use for the UE to validate the set of positioning models; a fifth indicator of a second maximum amount of processing power that the UE is configured to use for the UE to validate the set of positioning models; a sixth indicator of a set of timing gaps used by the UE for the UE to validate the set of positioning models; or a seventh indicator of a set of resource conditions associated with each of the set of positioning models.

Aspect 36 is the method of any of aspects 33 to 35, further comprising transmitting a request for the capability message before the reception of the capability message.

Aspect 37 is the method of any of aspects 33 to 36, wherein the capability message comprises a long-term evolution (LTE) positioning protocol (LPP) message comprising the capability message.

Aspect 38 is the method of aspect 37, wherein the LPP message comprises an LPP capability exchange message.

Aspect 39 is the method of any of aspects 20 to 38, wherein the network entity comprises at least one of a location management function (LMF) or an over-the-top (OTT) location server.

Aspect 40 is an apparatus for wireless communication, comprising: at least one memory; and at least one processor coupled to the at least one memory and, based at least in part on information stored in the at least one memory, the at least one processor, individually or in any combination, is configured to perform the method of any of aspects 1 to 39.

Aspect 41 is an apparatus for wireless communication, comprising means for performing each step in the method of any of aspects 1 to 39.

Aspect 42 is the apparatus of any of aspects 1 to 39, further comprising a transceiver configured to receive or to transmit in association with the method of any of aspects 1 to 39.

Aspect 43 is a computer-readable medium (e.g., a non-transitory computer-readable medium) storing computer executable code, the code when executed by at least one processor causes the at least one processor to perform the method of any of aspects 1 to 39.

What is claimed is:

1. An apparatus for wireless communication at a user equipment (UE), comprising:
at least one memory; and
at least one processor coupled to the at least one memory and, based at least in part on information stored in the at least one memory, the at least one processor, individually or in any combination, is configured to:
receive a first configuration to validate a positioning model;
receive a set of positioning signals;
measure the set of positioning signals based on the first configuration;
obtain a set of positioning model outputs based on the measured set of positioning signals and the first configuration; and
transmit a validation report based on the set of positioning model outputs and the first configuration.

2. The apparatus of claim 1, wherein, to obtain the set of positioning model outputs based on the measured set of positioning signals and the first configuration, the at least one processor, individually or in any combination, is configured to:
calculate the set of positioning model outputs based on the measured set of positioning signals and the first configuration using the positioning model.

3. The apparatus of claim 1, wherein, to obtain the set of positioning model outputs based on the measured set of positioning signals and the first configuration, the at least one processor, individually or in any combination, is configured to:
transmit the measured set of positioning signals based on the first configuration; and
receive the set of positioning model outputs based on the transmitted measured set of positioning signals and the positioning model.

4. The apparatus of claim 3, wherein the at least one processor, individually or in any combination, is further configured to:
transmit a second configuration to calculate the set of positioning model outputs based on the measured set of positioning signals and the first configuration before the transmission of the measured set of positioning signals.

5. The apparatus of claim 1, wherein the first configuration comprises at least one of:
a first indicator of a first schedule for when to obtain the set of positioning model outputs;
a second indicator of a first event that triggers the obtainment of the set of positioning model outputs;
a third indicator of how to format the validation report based on the set of positioning model outputs;
a fourth indicator of a set of resources to use for the measurement of the set of positioning signals;
a fifth indicator of a second schedule of when to transmit the validation report;
a sixth indicator of a second event that triggers the transmission of the validation report; or
a seventh indicator of the positioning model.

6. The apparatus of claim 1, wherein the at least one processor, individually or in any combination, is further configured to:
receive a second configuration to modify a positioning model configuration for life cycle management (LCM) of the positioning model at the UE; and
modify the positioning model configuration based on the second configuration.

7. The apparatus of claim 6, wherein the second configuration comprises at least one of:

a first indicator to activate the positioning model for a calculation of a second set of positioning model outputs;

a second indicator to deactivate a second positioning model for the calculation of the second set of positioning model outputs; or a third indicator to switch between using the positioning model or the second positioning model for the calculation of the second set of positioning model outputs.

8. The apparatus of claim 6, wherein, to receive the second configuration, the at least one processor, individually or in any combination, is configured to:

receive a long-term evolution (LTE) positioning protocol (LPP) message comprising the second configuration.

9. The apparatus of claim 8, wherein the LPP message comprises at least one of:

an LPP provide location message;

an LPP assistance data message;

an LPP broadcast message; or a positioning system information block (posSIB) message.

10. The apparatus of claim 1, wherein, to receive the first configuration, the at least one processor, individually or in any combination, is configured to:

receive a long-term evolution (LTE) positioning protocol (LPP) message comprising the first configuration.

11. The apparatus of claim 10, wherein the LPP message comprises at least one of:

an LPP provide location message;

an LPP assistance data message;

an LPP broadcast message; or a positioning system information block (posSIB) message.

12. The apparatus of claim 1, wherein the at least one processor, individually or in any combination, is further configured to:

calculate an accuracy metric of the positioning model by comparing the set of positioning model outputs to a set of expected outputs, wherein the validation report comprises an indicator of the calculated accuracy metric.

13. The apparatus of claim 12, wherein the at least one processor, individually or in any combination, is further configured to:

calculate the set of expected outputs based on the measured set of positioning signals using a second positioning model.

14. The apparatus of claim 12, wherein the at least one processor, individually or in any combination, is further configured to:

receive the set of expected outputs before the calculation of the accuracy metric.

15. The apparatus of claim 1, wherein the at least one processor, individually or in any combination, is further configured to:

transmit a capability message comprising an indicator that the UE is configured to validate the positioning model before the reception of the first configuration.

16. The apparatus of claim 15, wherein the capability message further comprises a set of capability conditions for the UE to validate a set of positioning models before the reception of the first configuration, wherein the first configuration satisfies the set of capability conditions, wherein the set of capability conditions comprise at least one of:

a first indicator of a maximum number of positioning models that the UE is configured to simultaneously stage for the UE to validate the set of positioning models;

a second indicator of a first maximum amount of memory that the UE is configured to use for the UE to validate the set of positioning models;

a third indicator of a second maximum amount of processing power that the UE is configured to use for the UE to validate the set of positioning models;

a fourth indicator of a set of timing gaps used by the UE for the UE to validate the set of positioning models; or a fifth indicator of a set of resource conditions associated with each of the set of positioning models.

17. The apparatus of claim 15, wherein the at least one processor, individually or in any combination, is further configured to:

receive a request for the capability message, wherein the transmission of the capability message is in response to the request.

18. The apparatus of claim 15, wherein the capability message comprises a long-term evolution (LTE) positioning protocol (LPP) message comprising the capability message.

19. The apparatus of claim 18, wherein the LPP message comprises an LPP capability exchange message.

20. An apparatus for wireless communication at a network entity, comprising:

at least one memory; and at least one processor coupled to the at least one memory and, based at least in part on information stored in the at least one memory, the at least one processor, individually or in any combination, is configured to:

transmit a first configuration to validate a positioning model, wherein the first configuration comprises a third indicator to validate the positioning model based on a set of expected outputs calculated based on a second positioning model;

receive a validation report comprising at least one of a first indicator that the positioning model is valid or a second indicator of a set of positioning model outputs based on the first configuration; and transmit the set of expected outputs before the reception of the validation report.

21. The apparatus of claim 20, wherein the at least one processor, individually or in any combination, is further configured to:

transmit a second configuration to modify a positioning model configuration for life cycle management (LCM) of the positioning model at a user equipment (UE) based on the validation report.

22. The apparatus of claim 21, wherein, to receive the validation report, the at least one processor, individually or in any combination, is configured to receive the validation report from the UE, wherein, to transmit the second configuration, the at least one processor, individually or in any combination, is configured to transmit the second configuration to the UE.

23. The apparatus of claim 21, wherein, to receive the validation report, the at least one processor, individually or in any combination, is configured to receive the validation report from a second UE different from the UE, wherein, to transmit the second configuration, the at least one processor, individually or in any combination, is configured to transmit the second configuration to the UE.

24. The apparatus of claim 20, wherein the at least one processor, individually or in any combination, is further configured to:

calculate the set of expected outputs before the transmission of the set of expected outputs.

25. The apparatus of claim 20, wherein the at least one processor, individually or in any combination, is further configured to:

receive a capability message comprising an indicator that a user equipment (UE) is configured to validate the positioning model, wherein the transmission of the first configuration is in response to the capability message.

26. The apparatus of claim 25, wherein the capability message further comprises a set of capability conditions for the UE to validate a set of positioning models before the reception of the first configuration, wherein the at least one processor, individually or in any combination, is further configured to:

configure the first configuration to satisfy the set of capability conditions before the transmission of the first configuration.

27. The apparatus of claim 25, wherein the at least one processor, individually or in any combination, is further configured to:

transmit a request for the capability message before the reception of the capability message.

28. A method of wireless communication at a user equipment (UE), comprising:

receiving a first configuration to validate a positioning model;

receiving a set of positioning signals;

measuring the set of positioning signals based on the first configuration;

obtaining a set of positioning model outputs based on the measured set of positioning signals and the first configuration; and transmitting a validation report based on the set of positioning model outputs and the first configuration.

29. A method of wireless communication at a network entity, comprising:

transmitting a first configuration to validate a positioning model, wherein the first configuration comprises a third indicator to validate the positioning model based on a set of expected outputs calculated based on a second positioning model;

receiving a validation report comprising at least one of a first indicator that the positioning model is valid or a second indicator of a set of positioning model outputs based on the first configuration; and transmitting the set of expected outputs before the reception of the validation report.

* * * * *